United States Patent
Nakagawa et al.

(10) Patent No.: US 7,342,076 B2
(45) Date of Patent: Mar. 11, 2008

(54) POLYMERS AND CURABLE COMPOSITIONS

(75) Inventors: Yoshiki Nakagawa, Kobe (JP); Kenichi Kitano, Kobe (JP)

(73) Assignee: Kaneka Corporation, Osaka (JP)

( * ) Notice: Subject to any disclaimer, the term of this patent is extended or adjusted under 35 U.S.C. 154(b) by 371 days.

(21) Appl. No.: 11/115,258

(22) Filed: Apr. 27, 2005

(65) Prior Publication Data

US 2005/0203204 A1  Sep. 15, 2005

Related U.S. Application Data

(62) Division of application No. 09/807,069, filed as application No. PCT/JP99/05556 on Oct. 8, 1999, now Pat. No. 6,933,350.

(30) Foreign Application Priority Data

Oct. 8, 1998 (JP) .................. 10/285796
Oct. 15, 1998 (JP) .................. 10/292675

(51) Int. Cl.
C08F 8/32 (2006.01)

(52) U.S. Cl. .............. 525/330.3; 525/330.6; 525/366; 525/375

(58) Field of Classification Search ........... 525/330.3, 525/330.6, 366, 375
See application file for complete search history.

(56) References Cited

U.S. PATENT DOCUMENTS

| | | | |
|---|---|---|---|
| 3,867,318 A | 2/1975 | Nishikubo et al. | |
| 4,188,472 A | 2/1980 | Chang | |
| 4,273,851 A | 6/1981 | Muzyczko et al. | |
| 4,303,924 A | 12/1981 | Young, Jr. | |
| 4,340,497 A | 7/1982 | Knopf | |
| 4,638,018 A | 1/1987 | Bauduin et al. | |
| 4,847,329 A | 7/1989 | Koleske et al. | |
| 4,874,799 A | 10/1989 | Hung et al. | |
| 5,112,881 A | 5/1992 | Mandal et al. | |
| 5,115,025 A | 5/1992 | Koleske et al. | |
| 5,179,183 A | 1/1993 | Koleske et al. | |
| 5,275,646 A | 1/1994 | Marshall et al. | |
| 5,376,169 A | 12/1994 | Hotomi et al. | |
| 5,703,141 A | 12/1997 | Jin | |
| 6,274,688 B1 | 8/2001 | Nakagawa et al. | |
| 6,423,787 B1 | 7/2002 | Kitano et al. | |

FOREIGN PATENT DOCUMENTS

| | | |
|---|---|---|
| EP | 0 465 039 B1 | 1/1995 |
| EP | 0 540 203 B1 | 12/1996 |
| EP | 0 789 036 A2 | 8/1997 |
| JP | 48-10394 B | 4/1973 |
| JP | 52-39742 A | 3/1977 |
| JP | 1-11102 A | 1/1989 |
| JP | 1-247403 A | 10/1989 |
| WO | WO-98/27171 | 6/1998 |
| WO | WO-99/06888 | 2/1999 |
| WO | WO-99/29787 | 6/1999 |
| WO | WO-99/29788 | 6/1999 |

OTHER PUBLICATIONS

U.S. Appl. No. 09/711,336, "Weather Resistant, Ink Jettable, Radiation Curable, Fluid Compositions Particularly Suitable for Outdoor Applications", Lee et al., Nov. 9, 2000.

U.S. Appl. No. 09/711,345, "Inks and Other Compositions Incorporating Limited Quantities of Solvent Advantageously Used in Ink Jetting Applications", Ylitalo et al., filed Nov. 9, 2000.

XP-002231508 (Abstract of JP 6211922A, Aug. 2, 1994), Data Base WPI Sect. Chem. Week 199435, Derwent Publications Ltd., London, GB.

XP-002231414 (Abstract of JP 06329720, Nov. 29, 1994) Data Base WPI Sect. Chem. Week 199507, Derwent Publications Ltd., London, GB.

*Primary Examiner*—Bernard Lipman
(74) *Attorney, Agent, or Firm*—Connolly Bove Lodge and Hutz

(57) ABSTRACT

The present invention is concerned with a vinyl polymer having at least one group of the general formula (1) per-molecule at the molecular chain terminus.

$$-Z-R-CR^1=CR^2R^3 \quad (1)$$

wherein Z represents an oxygen atom, a sulfur atom, a group of the formula NR', R' represents a univalent hydrocarbon group containing 1 to 20 carbon atoms, or a bivalent organic group containing 1 to 20 carbon atoms, and R represents a carbonyl group, a direct bond or a bivalent organic group containing 1 to 20 carbon atoms; $R^1$ and $R^2$ are the same or different and each represents a hydrogen atom or a univalent organic group containing 1 to 20 carbon atoms, and $R^3$ represents an organic group containing 1 to 20 carbon atoms.

The present invention is further concerned with a curable composition comprising the above vinyl polymer.

14 Claims, No Drawings

POLYMERS AND CURABLE COMPOSITIONS

This application is a Divisional of Ser. No. 09/807,069 filed Jul. 11, 2001, now U.S. Pat. No. 6,933,350, which is a National Stage of PCT/JP99/05556 filed Oct. 8, 1999.

TECHNICAL FIELD

The present invention relates to a vinyl polymer having a reactive functional group at a terminus and to a curable composition comprising the polymer.

BACKGROUND ART

It is known that a polymer having an alkenyl group at a molecular chain terminus undergoes crosslinking either by itself or in the presence of a curing agent such as a hydrosilyl-containing compound to give a heat-resistant, durable cured product. The main chain structure of such a polymer, so far known, includes polyether series polymers such as polyethylene oxide, polypropylene oxide, polytetramethylene oxide, etc.; hydrocarbon series polymers such as polybutadiene, polyisoprene, polychloroprene, polyisobutylene, etc., inclusive of hydrogenation products thereof; polyester series polymers such as polyethylene terephthalate, polybutylene terephthalate, polycaprolactone, etc.; and polysiloxane series polymers such as polydimethylsiloxane, among others, and these polymers have been used in various applications selectively according to the characteristics of the respective main chain structures.

Vinyl polymers have several characteristics not shared by the above various polymers, such as high weather-resistance, heat resistance, oil resistance and transparency, among others, and the use of the polymers having side-chain alkenyl groups has been advocated in the field of weather-resistant coatings (e.g. Japanese Kokai Publication Hei-3-277645; Japanese Kokai Publication Hei-7-0399).

However, alkenyl-terminated vinyl polymers cannot be easily produced and, therefore, have not been much employed on the industrial scene as yet.

Japanese Kokai Publication Hei-1-247403 discloses a process for producing an acrylic polymer having an alkenyl group at both termini which comprises using either an alkenyl group-containing dithiocarbamate or diallyl disulfide as the chain transfer agent.

Further, Japanese Kokai Publication Hei-6-211922 discloses a process for producing an alkenyl group-terminated acrylic polymer which comprises preparing a hydroxyl group-terminated acrylic polymer using a hydroxyl group-containing polysulfide or an alcoholic compound as the chain transfer agent in the first place and taking advantage of the reactivity of the hydroxyl group so introduced.

Meanwhile, curable compositions adapted to give rubber-like elastic products on curing have been used broadly in the field of adhesive, sealing and shock-absorbing materials. These compositions can be roughly classified by the mode of curing into the so-called moisture-curable compositions which are stable in a sealed environment but cure in the atmosphere by absorbing its moisture even at room temperature to give rubber-like elastic products and those compositions which are adapted to crosslink through hydrosilylation or the like reaction on exposure to heat.

However, by the above prior art technology, it is difficult to introduce an alkenyl group into the polymer terminus with good reproducibility. Moreover, since the standard radical polymerization reaction is utilized in these processes, there is the problem that the molecular weight distribution (the ratio of weight average molecular weight to number average molecular weight) of the product polymer is as broad as 2 or more and, therefore, the viscosity of the polymer is high. In utilizing the polymer as a sealant or an adhesive, for instance, such a high viscosity makes it difficult to handle the polymer and, moreover, a filler for reinforcement cannot be formulated in a sufficient amount.

It has also been found difficult to introduce a (meth) acryloyl group, which has radical polymerization activity, into a vinyl polymer which is synthesized by radical polymerization. Particularly, few compounds with a (meth) acryloyl group introduced into the oligomer terminus have so far been successfully synthesized.

In many of photocurable compositions so far available, a low molecular compound having a (meth)acryloyl group is employed. In such cases, the odor caused by vaporization of the unreacted low-boiling compound during and after curing has been a serious problem. To avoid this trouble, an oligomer having a (meth)acryloyl group is employed. However, chiefly from synthetic points of view, such oligomers are limited to epoxy-acrylate, urethane-acrylate, polyester-acrylate and the like systems. Moreover, oligomers having large molecular masses are not available. As a result, such compositions tend to give comparatively hard cured products and do not give cured products having good rubber-like elasticity.

In view of the above state of the art, the present invention has for its object to provide a vinyl polymer having a reactive functional group at a molecular chain terminus at a high rate and a curable composition comprising the polymer.

SUMMARY OF THE INVENTION

The present invention, therefore, is concerned with a vinyl polymer having at least one group of the general formula (1) per molecule at the molecular chain terminus.

$$-Z-R-CR^1=CR^2R^3 \quad (1)$$

wherein Z represents an oxygen atom, a sulfur atom, a group of the formula NR', R' represents a univalent hydrocarbon group containing 1 to 20 carbon atoms, or a bivalent organic group containing 1 to 20 carbon atoms, and R represents a carbonyl group, a direct bond or a bivalent organic group containing 1 to 20 carbon atoms; $R^1$ and $R^2$ are the same or different and each represents a hydrogen atom or a univalent organic group containing 1 to 20 carbon atoms, and $R^3$ represents an organic group containing 1 to 20 carbon atoms.

The present invention is further concerned with a curable composition comprising the above vinyl polymer.

The present invention is now described in detail.

DISCLOSURE OF THE INVENTION

In this specification, this vinyl polymer having at least one group of the general formula (1) per molecule at the molecular chain terminus is sometimes referred to as "polymer (I)". The "organic group" is not particularly restricted but is preferably a group comprising a carbon atom, a hydrogen atom and 0 to 2 oxygen atoms, more preferably a hydrocarbon group.

The polymer (I) will be described below in the first place.

<<Polymer (I)>>

<Explanation of the Group Represented by General Formula (1)>

The group of the general formula (1) is as described below.

Referring to the general formula (1), $R^1$ and $R^2$ may be the same or different and each represents a hydrogen atom or a univalent organic group containing 1 to 20 carbon atoms.

As specific examples of a univalent organic group containing 1 to 20 carbon atoms, there may be mentioned the following:

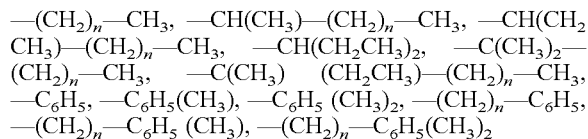

(n being an integer of not less than 0 and the total number of carbon atoms in each group being not more than 20). Among the above groups, hydrogen, methyl and ethyl are preferred and hydrogen and methyl are the more preferred, with hydrogen being particularly preferred.

In the general formula (1), $R^3$ represents a univalent organic group containing 1 to 20 carbon atoms. The univalent organic group containing 1 to 20 carbon atoms for $R^3$ includes not only the above-mentioned univalent organic groups containing 1 to 20 carbon atoms but also organic groups containing unsaturated groups or those having an aromatic ring. Preferred is an organic group such that, when the polymer (I) is formulated as a curable composition, the group of the general formula (1) may undergo crosslinking through a photodimerization or polymerization reaction with good efficiency.

From this point of view, $R^3$ is preferably an aryl group or a vinyl group. In this specification, when $R^3$ is an aryl group, the group of the general formula (1) is sometimes referred to as a cinnamate group for convenience's sake. By the same token, when $R^3$ is a vinyl group, the group of the general formula (1) is sometimes referred to as a conjugated diene group.

The aryl group mentioned above may have a substituent. This unsubstituted or substituted aryl group is specifically a phenyl, biphenyl or naphthyl group optionally having 1~3 substituents such as an alkyl group containing 1 to 4 carbon atoms, an alkoxy group containing 1 to 4 carbon atoms, hydroxyl, phenoxy, amino (which may be mono- or di-substituted by an alkyl group containing 1 to 4 carbon atoms), halogen, nitro, methylenedioxy, etc., and the substituents may be the same or different.

The aryl group is not particularly restricted but includes the following groups, among others.

Phenyl, o-, m- or p-tolyl, o-, m- or p-ethylphenyl, o-, m- or p-propylphenyl, m- or p-cumyl, o-, m- or p-butylphenyl, m- or p-isobutylphenyl, m- or p-s-butylphenyl, m- or p-t-butylphenyl, 2,3-, 2,4-, 2,5-, 2,6-, 3,4- or 3,5-dimethylphenyl, mesityl, o-, m- or p-methoxyphenyl, o-, m- or p-ethoxyphenyl, o-, m- or p-propoxyphenyl, m- or p-isopropoxyphenyl, o-, m- or p-butoxyphenyl, m- or p-isobutoxyphenyl, m- or p-s-butoxyphenyl, m- or p-t-butoxyphenyl, 2,3-, 2,4-, 2,5-, 2,6-, 3,4- or 3,5-dimethoxyphenyl, o-, m- or p-hydroxyphenyl, 2,3-, 2,4-, 2,5-, 2,6-, 3,4- or 3,5-dihydroxyphenyl, 3-hydroxy-4-methoxyphenyl, m- or p-phenoxyphenyl, o-, m- or p-aminophenyl, o-, m- or p-(N-methylamino)phenyl, o-, m- or p-(N,N-dimethylamino) phenyl, o-, m- or p-fluorophenyl, o-, m- or p-chlorophenyl, 2,4-dichlorophenyl, o-, m- or p-bromophenyl, o-, m- or p-nitrophenyl, 2,3- or 3,4-methylenedioxyphenyl, 2-, 3- or 4-biphenyl and α-, β-naphthyl, among others. Particularly preferred is phenyl.

When $R^3$ represents a vinyl group, this vinyl group may be substituted. Such a substituent includes the same univalent organic group containing 1 to 20 carbon atoms as mentioned for $R^1$, $R^2$ and $R^3$. The preferred example of the unsubstituted or substituted vinyl group $R^3$ is an unsubstituted vinyl group or a vinyl group having a methyl or ethyl as a substutuent. Particularly preferred is a substituted vinyl group of the formula —CH=CH—$CH_3$.

Z in the general formula (1) represents an oxygen atom, a sulfur atom, a group of the formula NR' (where R' represents a univalent organic group containing 1 to 20 carbon atoms) or a bivalent organic group containing 1 to 20 carbon atoms. Particularly preferred is an oxygen atom.

R in the general formula (1) represents a carbonyl group, a direct bond or a bivalent organic group of 1 to 20 carbon atoms. Particularly preferred is a carbonyl group.

Therefore, the preferred species of the general formula (1) is the following general formula (1').

In the above formula, $R^1$, $R^2$ and $R^3$ have the same meanings as defined above.

If the number of groups represented by general formula (1) is less than one on the average per mole of the polymer (I), a satisfactory cured product will not be obtained. In order to obtain a satisfactory cured product, the number of groups of the general formula (1) is preferably 1.1 to 5 on the average, more preferably 1.2 to 4 on the average.

<Main Chain of Polymer (I)>

The monomer constituting the main chain of the polymer (I) is not particularly restricted but may be any of various monomers. As examples, there may be mentioned (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl) trimethoxysilane, (meth) acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid and monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so forth. These may be used singly or a plurality of them may be copolymerized. In the case of copolymerization, both random copolymerization and block copolymerization may be employed.

Preferred among these monomers, from the viewpoint of physical properties of products, among others, are (meth) acrylic monomers, acrylonitrile monomers, styrenic monomers, fluorine-containing vinyl monomers and silicon-containing vinyl monomers. More preferred are acrylic ester monomers and methacrylic ester monomers. Butyl acrylate is still more preferred. In the practice of the present invention, these preferred monomers may be copolymerized with other monomers and, in such cases, the content of these preferred monomers is preferably 40% by weight. The expression "(meth)acrylic acid", for instance, so referred to hereinabove means "acrylic acid and/or methacrylic acid".

The molecular weight distribution, namely the ratio (Mw/Mn) of weight average molecular weight (Mw) to number average molecular weight (Mn), of the polymer (I) is not particularly restricted. For facilitating handling by keeping the viscosity of the curable composition at a low level while securing sufficient cured physical properties, however, a narrow molecular weight distribution is preferred. Preferred as the molecular weight distribution value is a value less than 1.8, more preferably not more than 1.7, still more preferably not more than 1.6, yet more preferably not more than 1.5, still more preferably not more than 1.4, most preferably not more than 1.3. The molecular weight distribution is determined most commonly by gel permeation chromatography (GPC). The number average molecular weight and so on can be determined on the polystyrene equivalent basis using chloroform or THF as the mobile phase and polystyrene gel columns as columns.

The molecular weight of the polymer (I) is not particularly restricted but is preferably within the range of 500 to 100,000. At a molecular weight smaller than 500, the intrinsic characteristics of vinyl polymers are hardly manifested and, at above 100,000, the handling may become difficult in some instances.

<Polymerization>

The radical polymerization method which can be used for synthesizing the vinyl polymer of the present invention can be divided into the "general radical polymerization method" in which a monomer having a given functional group is simply copolymerized with a vinyl monomer using an azo or peroxide compound as the polymerization initiator and the "controlled radical polymerization method" which is capable of introducing a given functional group into a defined position such as the terminus.

The "general radical polymerization method" is an expedient method. However, by this method, a monomer having a given functional group is introduced into the product polymer only in probabilities, and in order to synthesize a polymer of high functionality, the particular monomer must be used in a fairly large amount. When conversely the amount of the monomer is small, the ratio of polymer molecules not provided with the given functional group is increased. Another disadvantage is that since the reaction is a free radical polymerization, the molecular weight distribution is so broadened that only a polymer having a high viscosity can be obtained.

The "controlled radical polymerization method" can be divided into the "chain transfer agent technique" in which a vinyl polymer having a functional group at the terminus is produced by carrying out the polymerization using a chain transfer agent having a given functional group, and the "living radical polymerization technique" in which the polymerization proceeds with the growing chain terminus being constantly "growing" without being interrupted by a termination reaction to give a polymer approximating the designed molecular weight.

The "chain transfer agent technique" is capable of giving a polymer of high functionality but a chain transfer agent having a given functional group must be used in a fairly large amount relative to the initiator, with the consequent disadvantage in economics inclusive of the cost of treatment involved. A further disadvantage of the technique is that because it is also a free radical polymerization method as is said "general radical polymerization method", there can be obtained only a polymer having a broad molecular weight distribution and a high viscosity.

Unlike the above polymerization technology, the "living radical polymerization technique" is advantageous in that despite its also being a method for radical polymerization which is generally considered to be hardly controllable because of the high velocity of polymerization and high incidence of a termination reaction by radical-radical coupling or the like, a termination reaction does not easily take place, thus giving a polymer with a narrow molecular weight distribution (Mw/Mn =about 1.1 to 1.5), and further in that the molecular weight can be freely controlled by adjusting the monomer-initiator charge ratio.

Since "living radical polymerization" is thus capable of giving a polymer having a narrow molecular weight distribution profile and a low viscosity and enables introduction of a monomer having a given functional group in a more or less planned position, it is a further preferred method for producing said vinyl polymer having a given functional group according to the present invention.

In a narrow sense of the term, "living polymerization" means a polymerization in which the molecule chain grows with its growth terminus being constantly activated. Generally, however, the term is used to broadly cover as well a pseudo-living polymerization reaction in which the polymer grows while molecules with an activated terminus and molecules with an inactivated terminus are in equilibrium, and the term as used in this specification also has the latter broad meaning.

Recently, "living radical polymerization" has been studied in earnest by many research groups. By way of illustration, this technology includes the method employing a cobalt porphyrin complex as described in J. Am. Chem. Soc., 116, 7943 (1994); the method using a radical capping agent or such as a nitroxide compound as described in Macromolecules, 27, 7228 (1994), and the atom transfer radical polymerization (ATRP) method using an organohalogen compound as the initiator and a transition metal complex as the catalyst.

Among variations of "living radical polymerization", the "atom transfer radical polymerization", which comprises polymerizing a vinyl monomer(s) using an organohalogen compound or a sulfonyl halide compound as the initiator and a transition metal complex as the catalyst, is particularly advantageous in that, in addition to the above-mentioned characteristics of "living radical polymerization", it has a terminal halogen or the like group, which is relatively advantageous for functional group conversion reactions, and affords a higher degree of freedom in initiator and catalyst design, hence it is more preferred as the method of producing a vinyl polymer having a given functional group(s). As specific references to this atom transfer radical polymerization, Matyjaszewski et al., J. Am. Chem. Soc., 1995, vol. 117, page 5614; Macromolecules, 1995, vol. 28, page 7901; Science, 1996, vol. 272, page 866; WO 96/30421; WO 97/18247; and Sawamoto et al., Macromolecules, 1995, vol. 28, page 1721, among others, can be consulted.

In the practice of the invention, there is no particular limitation on which of these methods is employed. Basically, however, the controlled radical polymerization technique is utilized, and in consideration of the ease of reaction control, living radical polymerization is preferred and atom transfer radical polymerization is particularly preferred.

In the first place, the polymerization reaction utilizing a chain transfer agent, which is one of controlled radical polymerization, is explained. While the radical polymerization technique utilizing a chain transfer agent (telomer) is not particularly restricted but for the production of a vinyl polymer having a terminal structure suited to the present invention, the following two alternative techniques, among others, can be mentioned.

These are the process for producing a halogen-terminated polymer using a halogenated hydrocarbon as a chain transfer agent as described in Japanese Kokai Publication Hei-4-132706 and the process for producing a hydroxyl-terminated polymer using a hydroxyl-containing mercaptan, a hydroxyl-containing polysulfide or the like as the chain transfer agent as described in Japanese Kokai Publication Sho-61-271306, Japanese Patent 2594402, and Japanese Kokai Publication Sho-54-47782.

The living radical polymerization technique is now explained.

Among various versions of this technique, the process using a radical capping agent, such as a nitroxide compound, is first described. In this polymerization, a nitroxy free radical (=N—O.), which is generally stable, is used as the radical capping agent. While such a compound is not restricted, nitroxy free radicals from cyclic hydroxy amines, such as the 2,2,6,6-substituted-1-piperidinyloxy radical and 2,2,5,5-substituted-1-pyrrolidinyloxy radical, are preferred. Appropriate as the substituents are alkyl groups containing not more than 4 carbon atoms, such as methyl and ethyl groups. Specific nitroxy free radical compounds include but are not limited to the 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-tert-butylamineoxy radical, among others. Such a stable free radical as the galvinoxyl free radical may be used in lieu of the nitroxy free radical.

The above radical capping agent is used in combination with a radical generator. It is presumable that the reaction product from a radical capping agent with a radical generator serve as a polymerization initiator to thereby proceed the polymerization of an addition-polymerizable monomer(s). The mixing ratio of these two agents is not particularly restricted but the radical initiator can be appropriately used in an amount of 0.1 to 10 moles per mole of the radical capping agent.

Although various compounds can be used as the radical generator, a peroxide capable of generating a radical under polymerization temperature conditions is preferred. Such peroxide includes but is not limited to diacyl peroxides such as benzoyl peroxide and lauroyl peroxide, dialkyl peroxides such as dicumyl peroxide and di-tert-butyl peroxide, peroxydicarbonates such as diisopropyl peroxydicarbonate and bis (4-tert-butylcyclohexyl) peroxydicarbonate, alkyl peresters such as tert-butyl peroxyoctoate and tert-butyl peroxybenzoate, and the like. In particular, benzoyl peroxide is preferred. Furthermore, a different kind of radical generator, for example a radical-generating azo compound such as azobisisobutyronitrile, may be used in lieu of the peroxide.

As reported in Macromolecules, 1995, vol. 28, page 2993, such alkoxyamine compounds as shown below may be used as the initiator instead of the combined use of a radical capping agent and a radical generator.

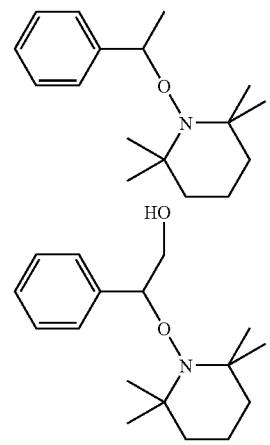

When an alkoxyamine compound is used as the initiator and the very compound has a hydroxyl or like functional group, as indicated by either formula shown above, a functional group-terminated polymer is obtained. By applying this principle to the method of the invention, a functional group-terminated polymer can be provided.

The monomer(s) and the polymerization conditions, such as solvent and polymerization temperature, to be used in the polymerization reaction using a radical capping agent such as a nitroxide compound as mentioned above are not particularly restricted but may be the same as those used in the atom transfer radical polymerization reaction to be described below.

The technique of atom transfer radical polymerization, which is a more preferred version of the technique of living radical polymerization according to the invention, is now described.

In this atom transfer radical polymerization, an organohalogen compound, in particular an organohalogen compound having a highly reactive carbon-halogen bond (e.g. a carbonyl compound having a halogen at the α position, or a compound having a halogen at the benzyl position), or a sulfonyl halide compound or the like is preferably used as the initiator.

Specific examples thereof are:

$C_6H_5$—$CH_2X$, $C_6H_5$—$C(H)$ $(X)CH_3$, $C_6H_5$—$C(X)$ $(CH_3)_2$ (in the above formulas, $C_6H_5$ denotes a phenylene group and X represents a chlorine, bromine or iodine atom), $R^{25}$—C(H) (X)—$CO_2R^{26}$, $R^{25}$—C($CH_3$) (X)—$CO_2R^{26}$, $R^{25}$—C(H) (X)—C(O)$R^{26}$, $R^{25}$—C($CH_3$) (X)—C (O) $R^{26}$ (in the above formulas, $R^{25}$ and $R^{26}$ may be the same or different and each represents a hydrogen atom or a $C_{1-20}$ alkyl group, aryl group or aralkyl group and X represents a chlorine, bromine or iodine atom), $R^{25}$—$C_6H_4$—$SO_2X$ (in the above formulas, $R^{25}$ represents a hydrogen atom or a $C_{1-20}$ alkyl group, aryl group or aralkyl group and X represents a chlorine, bromine or iodine atom).

As the initiator for living radical polymerization, an organohalogen or sulfonyl halide compound having a functional group other than the functional group in charge of initiation of polymerization can also be employed. In such cases, there is produced a vinyl polymer having the functional group in question at one main chain terminus and a halogen group at the other main chain terminus. As such functional groups, there can be mentioned alkenyl, crosslinking silyl, hydroxyl, epoxy, amino and amido groups, among others, can be mentioned.

The alkenyl-containing organohalogen compound is not particularly restricted but includes, among others, compounds having the structure represented by the general formula (8):

$$R^8R^9C(X)—R^{10}—R^{11}—C(R^7)=CH_2 \qquad (8)$$

wherein $R^7$ represents an organic group containing 1 to 20 carbon atoms, preferably a hydrogen atom or a methyl group; $R^8$ and $R^9$ each represents a hydrogen atom, a univalent $C_{1-20}$ alkyl, aryl or aralkyl group; or they are linked together at the respective free termini; $R^{10}$ represents —C(O)O— (ester group), —C(O)— (keto group) or an o-, m- or p-phenylene group; $R^{11}$ represents a direct bond or a bivalent $C_{1-20}$ organic group optionally containing one or more ether linkages and X represents a chlorine, bromine or iodine atom.

As specific examples of the substituents $R^8$ and $R^9$, there can be mentioned hydrogen, methyl, ethyl, n-propyl, isopropyl, butyl, pentyl and hexyl, among others. $R^8$ and $R^9$ may be joined to each other at the respective free termini to form a cyclic structure.

As specific examples of the alkenyl-containing organohalogen compound represented by the general formula (8) there may be mentioned the following:

$XCH_2C(O)O(CH_2)_nCH=CH_2$, $H_3CC(H) (X)C(O)O(CH_2)_n CH=CH_2$, $(H_3C)_2C(X)C(O)O(CH_2)_nCH=CH_2$, $CH_3CH_2C (H) (X)C(O)O(CH_2)_nCH=CH_2$,

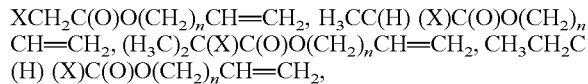

(in the above formulas, X represents a chlorine, bromine or iodine atom and n represents an integer of 0 to 20), $XCH_2C (O)O(CH_2)_nO(CH_2)_mCH=CH_2$, $H_3CC(H) (X)C (O)O(CH_2)_nO(CH_2)_mCH=CH_2$, $(H_3C)_2C(X)C(O)O(CH_2)_n O(CH_2)_mCH=CH_2$, $CH_3CH_2C(H) (X)C(O)O(CH_2)_nO (CH_2)_mCH=CH_2$,

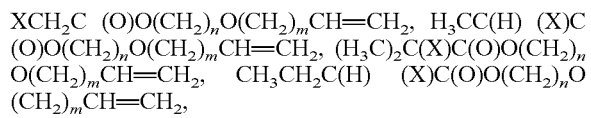

(in the above formulas, X represents. a chlorine, bromine or iodine atom, n represents an integer of 1 to 20 and m represents an integer of 0 to 20), o-, m-, p-$XCH_2$—$C_6H_4$—$(CH_2)_n$—CH=$CH_2$, o-, m-, p-$CH_3C(H)$ (X)—$C_6H_4$—$(CH_2)_n$—CH=$CH_2$, o-, m-, p-$CH_3CH_2C$ (H) (X)—$C_6H_4$—$(CH_2)_n$—CH=$CH_2$ (in the above formulas, X represents a chlorine, bromine or iodine atom and n represents an integer of 0 to 20), o-, m-, p-$XCH_2$—$C_6H_4$—$(CH_2)_n$—O—$(CH_2)_m$—CH=$CH_2$, o-, m-, p-$CH_3C$ (H) (X)—$C_6H_4$—$(CH_2)_n$—O—$(CH_2)_m$—CH=$CH_2$, o-, m-, p-$CH_3CH_2C$ (H) (X)—$C_6H_4$—$(CH_2)_n$—O—$(CH_2)_m$—CH=$CH_2$ (in the above formulas, X represents a chlorine, bromine or iodine atom, n represents an integer of 1 to 20 and m represents an integer of 0 to 20), o-, m-, p-$XCH_2$—$C_6H_4$—O—$(CH_2)_n$—CH=$CH_2$, o-, m-, p-$CH_3C(H)$ (X)—$C_6H_4$—O—$(CH_2)_n$—CH=$CH_2$, o-, m-, p-$CH_3CH_2C(H)$ (X)—$C_6H_4$—O—$(CH_2)_n$—CH=$CH_2$ (in the above formulas, X represents a chlorine, bromine or iodine atom and n represents an integer of 0 to 20)

o-, m-, p-$XCH_2$—$C_6H_4$—O—$(CH_2)_n$—O—$(CH_2)_m$—CH=$CH_2$, o-, m-, p-$CH_3C$ (H) (X)—$C_6H_4$—O—$(CH_2)_n$—O—$(CH_2)_m$—CH=$CH_2$, o-, m-, p-$CH_3CH_2C$ (H) (X)—$C_6H_4$—O—$(CH_2)_n$—O—$(CH_2)_m$—CH=$CH_2$ (in the above formulas, X represents a chlorine, bromine or iodine atom, n represents an integer of 1 to 20 and m represents an integer of 0 to 20).

As the alkenyl-containing organohalogen compound, there may further be mentioned compounds represented by the general formula (9):

$$H_2C=C(R^7)—R^{11}—C(R^8) (X)—R^{12}—R^9 \qquad (9)$$

wherein $R^7$, $R^8$, $R^9$, $R^{11}$ and X are as defined above and $R^{12}$ represents a direct bond, —C(O)O— (ester group), —C(O)— (keto group) or an o-, m- or p-phenylene group.

$R^{11}$ is a direct bond or a bivalent organic group containing 1 to 20 carbon atoms (which may contain one or more ether linkages) and, when it is a direct bond, the vinyl group is bound to the carbon atom to which the halogen atom is bound, giving an allyl halide compound. In this case, the carbon-halogen bond is activated by the neighboring vinyl group and, therefore, $R^{12}$ is not always required to be a C(O)O group, a phenylene group or the like but may be a direct bond. In cases where $R^{11}$ is not a direct bond, $R^{12}$ is preferably a C(O)O, C(O) or phenylene group so that the carbon-halogen bond may be activated.

The compound of the above general formula (9) specifically includes, among others, the following compounds:

$CH_2=CHCH_2X$, $CH_2=C(CH_3)$ $CH_2X$, $CH_2=CHC(H)$ (X)$CH_3$, $CH_2=C(CH_3)C(H)$ (X)$CH_3$, $CH_2=CHC(X)$ $(CH_3)_2$, $CH_2=CHC(H)$ (X)$C_2H_5$, $CH_2=CHC(H)$ (X)CH $(CH_3)_2$, $CH_2=CHC(H)$ (X)$C_6H_5$, $CH_2=CHC(H)$ (X)$CH_2C_6H_5$, $CH_2=CHCH_2C(H)$ (X)—$CO_2R$, $CH_2=CH$ $(CH_2)_2C(H)$ $(X)$—$CO_2R$, $CH_2$=$CH(CH_2)_3C(H)$ $(X)$—$CO_2R$, $CH_2$=$CH(CH_2)_8C(H)$ $(X)$—$CO_2R$, $CH_2$=$CHCH_2C(H)$ $(X)$—$C_6H_5$, $CH_2$=$CH(CH_2)_2C(H)$ $(X)$—$C_6H_5$, $CH_2$=$CH(CH_2)_3C(H)$ $(X)$—$C_6H_5$ (in the above formulas, X represents a chlorine, bromine or iodine atom and R represents a $C_{1-20}$ alkyl group, aryl group or aralkyl group).

The alkenyl-containing sulfonyl halide compound specifically includes, among others, the following compounds:

o-, m-, p-$CH_2$=$CH$—$(CH_2)_n$—$C_6H_4$—$SO_2X$, o-, m-, p-$CH_2$=$CH$—$(CH_2)_n$—O—$C_6H_4$—$SO_2X$ (in the above formulas, X represents a chlorine, bromine or iodine atom and n represents an integer of 0 to 20).

The above crosslinking silyl-containing organohalogen compound includes but is not limited to compounds having a structure represented by the general formula (10):

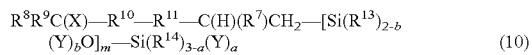
(10)

wherein $R^7$, $R^8$, $R^9$, $R^{10}$, $R^{11}$, and X are as defined above; $R^{13}$ and $R^{14}$ each represents a $C_{1-20}$ alkyl, aryl or aralkyl group or a triorganosiloxy group of the formula $(R')_3SiO$— (in which R' is a univalent hydrocarbon group containing 1~20 carbon atoms and the three R' groups may be the same or different) and, when two or more $R^{13}$ or $R^{14}$ groups are present, they may be the same or different; Y represents a hydroxyl group or a hydrolyzable group and, when two or more Y groups are present, they may be the same or different; a represents 0, 1, 2 or 3; b represents 0, 1 or 2; and m is an integer of 0 to 19, with the condition that the relation a+bm24 1 should be satisfied.

Specific examples of the compound of the general formula (10) are:

$XCH_2C(O)O(CH_2)_n Si$ $(OCH_3)_3$, $CH_3C(H)$ $(X)C(O)O$ $(CH_2)_n Si$ $(OCH_3)_3$, $(CH_3)_2C(X)C(O)O(CH_2)_n Si(OCH_3)_3$, $XCH_2C(O)O(CH_2)_n Si(CH_3)$ $(OCH_3)_2$, $CH_3C(H)$ $(X)C(O)O$ $(CH_2)_n Si(CH_3)$ $(OCH_3)_2$, $(CH_3)_2C(X)C(O)O(CH_2)_n Si$ $(CH_3)$ $(OCH_3)_2$, (in the above formulas, X is a chlorine, bromine or iodine atom and n is an integer of 0 to 20);

$XCH_2C(O)O(CH_2)_nO(CH_2)_mSi(OCH_3)_3$, $H_3CC(H)$ $(X)C$ $(O)O(CH_2)_nO(CH_2)_mSi(OCH_3)_3$, $(H_3C)_2C(X)C(O)O(CH_2)_n$ $O(CH_2)_mSi(OCH_3)_3$, $CH_3CH_2C(H)$ $(X)C(O)O(CH_2)_nO$ $(CH_2)_mSi(OCH_3)_3$, $XCH_2C(O)O(CH_2)_nO(CH_2)_mSi(CH_3)$ $(OCH_3)_2$, $H_3CC(H)$ $(X)C(O)O(CH_2)_nO(CH_2)_m$—$Si(CH_3)$ $(OCH_3)_2$, $(H_3C)_2C(X)C(O)O(CH_2)_nO(CH_2)_m$—$Si(CH_3)$ $(OCH_3)_2$, $CH_3CH_2C(H)$ $(X)C(O)O(CH_2)_nO(CH_2)_m$—$Si$ $(CH_3)$ $(OCH_3)_2$, (in the above formulas, X is a chlorine, bromine or iodine atom; n is an integer of 1 to 20; and m is an integer of 0 to 20)

o, m, p-$XCH_2$—$C_6H_4$—$(CH_2)_2Si(OCH_3)_3$, o, m, p-$CH_3C$ (H) $(X)$—$C_6H_4$—$(CH_2)_2Si$ $(OCH_3)_3$, o, m, p-$CH_3CH_2C(H)$ $(X)$—$C_6H_4$—$(CH_2)_2Si(OCH_3)_3$, o, m, p-$XCH_2$—$C_6H_4$— $(CH_2)_3Si$ $(OCH_3)_3$, o, m, p-$CH_3C(H)$ $(X)$—$C_6H_4$—$(CH_2)_3$ $Si(OCH_3)_3$, o, m, p-$CH_3CH_2C(H)$ $(X)$-$C_6H_4$—$(CH_2)_3Si$ $(OCH_3)_3$, o, m, p-$XCH_2$—$C_6H_4$—$(CH_2)_2$—$O$—$(CH_2)_3Si$ $(OCH_3)_3$, o, m, p-$CH_3C(H)$ $(X)$—$C_6H_4$—$(CH_2)_2$—$O$—$(CH_2)_3$ $Si(OCH_3)_3$, o, m, p-$CH_3CH_2C(H)$ $(X)$—$C_6H_4$—$(CH_2)_2$— $O$—$(CH_2)_3Si(OCH_3)_3$, o, m, p-$XCH_2$—$C_6H_4$—O—$(CH_2)_3$ $Si(OCH_3)_3$, o, m, p-$CH_3C(H)$ $(X)$—$C_6H_4$—O—$(CH_2)_3Si$ $(OCH_3)_3$, o, m, p-$CH_3CH_2C(H)$ $(X)$—$C_6H_4$—O—$(CH_2)_3Si$ $(OCH_3)_3$, o, m, p-$XCH_2$—$C_6H_4$—O—$(CH_2)_2$—O— $(CH_2)_3$—Si $(OCH_3)_3$, o, m, p-$CH_3C(H)$ $(X)$—$C_6H_4$—O— $(CH_2)_2$—O—$(CH_2)_3$—$Si(OCH_3)_3$, and o, m, p-$CH_3CH_2C$ (H) $(X)$—$C_6H_4$—O—$(CH_2)_2$—O—$(CH_2)_3Si(OCH_3)_3$, (in the above formulas, X is a chlorine, bromine or iodine atom) among others.

As further examples of the crosslinking silyl-containing organohalogen compound, there may be mentioned compounds having a structure represented by the general formula (11):

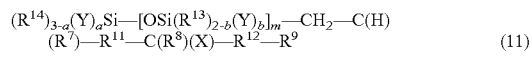
(11)

wherein $R^7$, $R^8$, $R^9$, $R^{11}$, $R^{12}$, $R^{13}$, $R^{14}$, a, b, m, X and Y are as defined above.

Specific examples of such compound are as follows:

$(CH_3O)_3SiCH_2CH_2C(H)$ $(X)$ $C_6H_5$, $(CH_3O)_2(CH_3)$ $SiCH_2CH_2C(H)$ $(X)C_6H_5$, $(CH_3O)_3Si(CH_2)_2C(H)$ $(X)$-$CO_2R$, $(CH_3O)_2(CH_3)Si(CH_2)_2C(H)$ $(X)$—$CO_2R$, $(CH_3O)_3$ $Si(CH_2)_3C(H)$ $(X)$—$CO_2R$, $(CH_3O)_2(CH_3)Si(CH_2)_3C(H)$ $(X)$—$CO_2R$, $(CH_3O)_3Si(CH_2)_4C(H)$ $(X)$—$CO_2R$, $(CH_3O)_2$ $(CH_3)Si(CH_2)_4C(H)$ $(X)$—$CO_2R$, $(CH_3O)_3Si(CH_2)_9C(H)$ $(X)$—$CO_2R$, $(CH_3O)_2(CH_3)Si(CH_2)_9C(H)$ $(X)$—$CO_2R$, $(CH_3O)_3Si(CH_2)_3C(H)$ $(X)$—$C_6H_5$, $(CH_3O)_2(CH_3)Si$ $(CH_2)_3C(H)$ $(X)$—$C_6H_5$, $(CH_3O)_3Si(CH_2)_4C(H)$ $(X)$— $C_6H_5$, and $(CH_3O)_2(CH_3)Si(CH_2)_4C(H)$ $(X)$—$C_6H_5$, (in the above formulas, X is a chlorine, bromine or iodine atom and R is a $C_{1-20}$ alkyl, aryl or aralkyl group), among others.

The hydroxyl-containing organohalogen compound or sulfonyl halide compound is not particularly restricted but may be a compound in the following:

HO—$(CH_2)_n$—$OC(O)C(H)$ $(R)$ $(X)$ 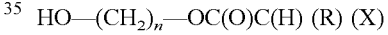

wherein X is a chlorine, bromine or iodine atom; R is a hydrogen atom or a $C_{1-20}$ alkyl, aryl or aralkyl group; and n is an integer of 1 to 20.

The amino-containing organohalogen compound or sulfonyl halide compound is not particularly restricted but may be a compound in the following:

$H_2N$—$(CH_2)_n$—$OC(O)C(H)$ $(R)$ $(X)$ 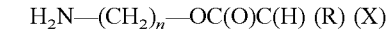

wherein X is a chlorine, bromine or iodine atom; R is a hydrogen atom or a $C_{1-20}$ alkyl, aryl or aralkyl group;. and n is an integer of 1 to 20.

The epoxy-containing organohalogen compound or sulfonyl halide compound is not particularly restricted but may be a compound in the following:

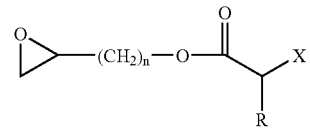

wherein X is a chlorine, bromine or iodine atom; R is a hydrogen atom or a $C_{1-20}$ alkyl, aryl or aralkyl group; and n is an integer of 1 to 20.

For obtaining a vinyl polymer by this polymerization method, an organohalogen compound or sulfonyl halide compound having two or more initiation sites can be used as the initiator to obtain a polymer having two growing termini. Specific examples thereof are:

o-, m- or p-XCH$_2$—C$_6$H$_4$—CH$_2$X, o-, m-or p-CH$_3$C(H)(X)—C$_6$H$_4$—C(H) (X)CH$_3$, o-, m- or p-(CH$_3$)$_2$C(X)—C$_6$H$_4$—C(X) (CH$_3$)$_2$ (in the above formulas, C$_6$H$_4$ denotes a phenylene group and X represents a chlorine, bromine or iodine atom), RO$_2$C—C (H) (X)—(CH$_2$)$_n$—C(H) (X)—CO$_2$R, RO$_2$C—C(CH$_3$) (X)—(CH$_2$)$_n$—C(CH$_3$) (X)—CO$_2$R, RC(O)—C(H)(X)—(CH$_2$)$_n$—C(H) (X)—C(O)R, RC(O)—C(CH$_3$) (X)—(CH$_2$)$_n$—C(CH$_3$) (X)—C(O)R (in the above formulas, R represents a C$_{1-20}$ alkyl group; aryl group or aralkyl group; n represents an integer of 0 to 20; and X represents a chlorine, bromine or iodine atom), XCH$_2$—C(O)—CH$_2$X, H$_3$C—C(H) (X)—C(O)—C(H)(X)—CH$_3$, (H$_3$C)$_2$C(X)—C (O)—C(X) (CH$_3$)$_2$, C$_6$H$_5$C(H)(X)—(CH$_2$)$_n$—C(H) (X)C$_6$H$_5$ (in the above formulas, X represents a chlorine, bromine or iodine atom and n represents an integer of 0 to 20), XCH$_2$CO$_2$—(CH$_2$)$_n$—OCOCH$_2$X, CH$_3$C(H) (X)CO$_2$—(CH$_2$)$_n$—OCOC(H) (X)CH$_3$, (CH$_3$)$_2$C(X)CO$_2$—(CH$_2$)$_n$—OCOC(X) (CH$_3$)$_2$ (in the above formulas, n represents an integer of 1 to 20), XCH$_2$C(O)C(O)CH$_2$X, CH$_3$C(H) (X)C(O)C(O)C(H)(X)CH$_3$, (CH$_3$)$_2$C(X)C(O)C(O)C(X) (CH$_3$)$_2$, o-, m- or p-XCH$_2$CO$_2$—C$_6$H$_4$—OCOCH$_2$X, o-, m- or p-CH$_3$C(H)(X)CO$_2$—C$_6$H$_4$—OCOC(H) (X)CH$_3$, o-, m- or p-(CH$_3$)$_2$C(X)CO$_2$—C$_6$H$_4$—OCOC(X) (CH$_3$)$_2$, o-, m- or p-XSO$_2$—C$_6$H$_4$—SO$_2$X (in the above formulas, X represents a chlorine, bromine or iodine atom).

The transition metal complex to be used as the polymerization catalyst is not particularly restricted but includes, as preferred species, transition metal complexes the central metal of which belongs to the group 7, 8, 9, 10 or 11 of the periodic table of the elements. As more preferred species, there may be mentioned complexes of zero-valence copper, univalent copper, bivalent ruthenium, bivalent iron or bivalent nickel. Copper complexes are preferred among others. As specific examples of the univalent copper compound, there may be mentioned cuprous chloride, cuprous bromide, cuprous iodide, cuprous cyanide, cuprous oxide and cuprous perchlorate. When a copper compound is used, a ligand, for example 2,2'-bipyridyl or a derivative thereof, 1,10-phenanthroline or a derivative thereof, or a polyamine such as tetramethylethylenediamine, pentamethyldiethylenetriamine or hexamethyltris(2-aminoethyl) amine, is added for increasing the catalytic activity. The tristriphenylphosphine complex of bivalent ruthenium chloride (RuCl$_2$(PPh$_3$)$_3$) is also suited for use as the catalyst. When a ruthenium compound is used as the catalyst, an aluminum alkoxide is added as an activator. Further, the bistriphenylphosphine complex of bivalent iron (FeCl$_2$(PPh$_3$)$_2$), the bistriphenylphosphine complex of bivalent nickel (NiCl$_2$(PPh$_3$)$_2$) and the bistributylphosphine complex of bivalent nickel (NiBr$_2$(PBu$_3$)$_2$) are also suited as catalysts.

The vinyl monomer to be used in this polymerization is not particularly restricted but any of those already mentioned specifically hereinabove can appropriately be used.

The above polymerization reaction can be carried out without using any solvent or in any of various organic solvents. As the solvents, there may be mentioned hydrocarbon solvents such as benzene and toluene; ether solvents such as diethyl ether, tetrahydrofuran, diphenyl ether, anisole and dimethoxybenzene; halogenated hydrocarbon solvents such as methylene chloride, chloroform and chlorobenzene; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; and so on. These may be used singly or two or more of them may be used in admixture. It is also possible to carry out the polymerization in an emulsion system or a system in which the supercritical fluid CO$_2$ is used as a medium.

This polymerization can be carried out in the temperature range of 0 to 200° C., preferably within the range of room temperature to 150° C., although such range is not critical.

<General Schema for Introduction of a Terminal Functional Group for Polymer (I)>

The method for introduction of a terminal functional group for polymer [I] is now described in detail.

In the present invention, the technology of introducing a group of the general formula (1) into the polymer terminus is not particularly restricted but includes the following processes.

① The process which comprises substituting a compound of the following general formula (2) for a terminal halogen group of a vinyl polymer having a halogen atom at a molecular chain terminus.

$$M^+{}^-OC(O)CR^1{=}CR^2R^3 \qquad (2)$$

[wherein R$^1$, R$^2$ and R$^3$ are as defined hereinbefore; M$^+$ represents an alkali metal ion or a quaternary ammonium ion]

② The process which comprises reacting a vinyl polymer having a hydroxyl group at a molecular chain terminus with a compound of the general formula (4).

$$XC(O)CR^1{=}CR^2R^3 \qquad (4)$$

[wherein R, R$^2$ and R$^3$ are as defined hereinbefore; X represents a chlorine or bromine atom or a hydroxyl group]

③ The process which comprises reacting a vinyl polymer having a hydroxyl group at a molecular chain terminus with a diisocyanate compound and causing the residual unreacted isocyanato group to react with a compound of the general formula (5).

$$HO-Q-C(O)CR^1{=}CR^2R^3 \qquad (5)$$

[wherein R$^1$, R$^2$ and R$^3$ are as defined hereinbefore; Q represents a bivalent organic group containing 2 to 20 carbon atoms]

④ The process which comprises reacting a vinyl polymer (II) having a silanol group at at least one molecular chain terminus with a silicon compound of the general formula (6).

$$X'SiR''_2\text{-}G\text{-}C(O)CR^1{=}CR^2R^3 \qquad (6)$$

[wherein R$^1$, R$^2$ and R$^3$ are as defined hereinbefore; R" represents a hydrocarbon group containing 1 to 14 carbon atoms or a halogenated hydrocarbon group containing 1 to 10 carbon atoms; the plurality of R" may be the same or different; X' represents a hydrolyzable group; G represents an oxyalkylene group of 1 to 4 carbon atoms]

In this specification, the vinyl polymer (II) having a silanol group at at least one molecular chain terminus is sometimes referred to briefly as polymer (II).

The above processes are respectively described in detail below.

<Introduction ① of a Terminal Functional Group for Polymer (I)>

The process ① is now described in detail.

① The process which comprises substituting a compound of the following general formula (2) for a terminal halogen group of a vinyl polymer having a halogen atom at a molecular chain terminus.

$$M^+ {}^- OC(O)CR^1 = CR^2R^3 \quad (2)$$

[wherein $R^1$, $R^2$ and $R^3$ are as defined hereinbefore; $M^+$ represents an alkali metal ion or a quaternary ammonium ion]

The halogen-containing terminus of the vinyl polymer having a halogen atom at a molecular chain terminus is preferably the structure represented by the following general formula (3):

$$-CR^{22}R^{23}X \quad (3)$$

[wherein $R^{22}$ and $R^{23}$ each represents a group linked to the ethylenically unsaturated group of the vinyl monomer; X represents a chlorine, bromine or iodine group]

The vinyl polymer having a terminal structure of the general formula (3) can be produced by the above-mentioned method for polymerizing a vinyl monomer using an organohalogen compound or a sulfonyl halide compound as the initiator and a transition metal complex as the catalyst or the above-mentioned method for polymerizing a vinyl monomer using a halogen compound as the chain transfer agent, preferably by the former method.

Referring to the above general formula (2), $M^+$ represents the counter cation to the oxyanion, for example, an alkali metal ion or a quaternary ammonium ion. As specific examples of the alkali metal ion, there may be mentioned the lithium ion, sodium ion and potassium ion. As the quaternary ammonium ion, there may be mentioned the tetramethylammonium ion, tetraethylammonium ion, tetrabenzylammonium ion, trimethyldodecylammonium ion, tetrabutylammonium ion and dimethylpiperidinium ion. Preferred are sodium ion and potassium ion.

The amount of use of the oxyanion of the general formula (2) is preferably 1 to 5 equivalents, more preferably 1.0 to 1.2 equivalents relative to a terminal halogen group of the general formula (3). The solvent for use in carrying out this reaction is not particularly restricted but, because the reaction is a nucleophilic substitution reaction, is preferably a polar solvent such as, for example, tetrahydrofuran, dioxane, diethyl ether, acetone, dimethyl sulfoxide, dimethylformamide, dimethylacetamide, hexamethylphosphoric amide, acetonitrile and so on. The reaction temperature is not particularly restricted but generally the reaction is conducted at 0 to 150° C., preferably at a temperature not over 100° C. for sustaining the polymeric terminal group, more preferably at room temperature.

<Introduction ② of a Terminal Functional Group for Polymer (I)>

The process ② mentioned above is described.

② The process which comprises reacting a vinyl polymer having a hydroxyl group at a molecular chain terminus with a compound of the general formula (4).

$$XC(O)CR^1 = CR^2R^3 \quad (4)$$

wherein $R^1$, $R^2$ and $R^3$ are as defined hereinbefore; X represents a chlorine or bromine atom or a hydroxyl group.

The vinyl polymer having a hydroxyl group at a molecular chain terminus can be produced by the above-mentioned method for polymerizing a vinyl monomer using an organohalogen compound or a sulfonyl halide compound as the initiator and a transition metal complex as the catalyst or the above-mentioned method for polymerizing a vinyl monomer using a hydroxyl group-containing compound as the chain transfer agent, preferably by the former method. The specific technique which can be used for producing a vinyl polymer having a hydroxyl group at a molecular chain terminus is not restricted but includes the following processes in addition to the above-mentioned method using a hydroxyl group-containing initiator.

(a) The process which comprises subjecting a compound having both a polymerizable alkenyl group and a hydroxyl group as represented by the following general formula (12) to reaction as a second monomer in synthesizing the vinyl polymer by living radical polymerization:

$$H_2C = C(R^{15}) - R^{16} - R^{17} - OH \quad (12)$$

wherein $R^{15}$ represents an organic group containing 1 to 20 carbon atoms, preferably a hydrogen atom or a methyl group, and may be the same or different; $R^{16}$ represents —C(O)O— (an ester group) or an o-, m- or p-phenylene group; $R^{17}$ represents a direct bond or a bivalent organic group containing 1 to 20 carbon atoms which may optionally contain one or more ether linkages. The compound in which $R^{15}$ represents an ester group is a (meth)acrylate compound and the compound in which $R^{16}$ represents a phenylene group is a styrenic compound.

The timing of reacting the compound having both a polymerizable alkenyl group and a hydroxyl group in each molecule is not particularly restricted but, when the expression of rubber-like properties are expected, the compound is subjected to reaction as a second monomer preferably at the final stage of the polymerization reaction or after completion of the reaction of the predetermined vinyl monomer.

(b) The process which comprises subjecting a compound having a sparingly polymerizable alkenyl group and a hydroxyl group in each molecule to reaction as a second monomer at the final stage of the polymerization reaction or after completion of the reaction of the predetermined vinyl monomer in synthesizing the vinyl polymer by living radical polymerization. Such compound is not particularly restricted but includes, among others, compounds represented by the general formula (13):

$$H_2C = C(R^{15}) - R^{18} - OH \quad (13)$$

wherein $R^{15}$ is as defined above and $R^{18}$ represents a bivalent $C_{1-20}$ organic group optionally containing one or more ether linkages.

The compound represented by the above general formula (13) is not particularly restricted but alkenyl alcohols such as 10-undecenol, 5-hexenol and allyl alcohol are preferred from availability points of view.

(c) The process disclosed in Japanese Kokai Publication Hei-04-132706, for instance, which comprises terminally introducing a hydroxyl group by hydrolyzing the halogen of a vinyl polymer having at least one carbon-halogen bond represented by the general formula (2) as obtained by atom transfer radical polymerization or reacting the halogen with a hydroxyl-containing compound.

(d) The process which comprises reacting a vinyl polymer having at least one carbon-halogen bond represented by the general formula (3) as obtained by atom transfer radical polymerization with a stabilized, hydroxyl-containing carbanion such as one represented by the general formula (14) to thereby effect substitution for the halogen:

$$M^+C^-(R^{23})(R^{24})\text{---}R^{18}\text{---}OH \tag{14}$$

wherein $R^{18}$ is as defined above; $R^{23}$ and $R^{24}$ each represents an electron-attracting group stabilizing the carbanion $C^-$ or one of them represents such an electron-attracting group and the other represents a hydrogen atom, an alkyl group containing 1~10 carbon atoms or a phenyl group. As the electron-attracting group $R^{23}$ and/or $R^{24}$, there may be mentioned —$CO_2R$ (ester group) —C(O)R (keto group), —$CON(R_2)$ (amide group), —COSR (thioester group), —CN (nitrile group) and —$NO_2$ (nitro group), among others. The substituent R is an alkyl group containing 1 to 20 carbon atoms, an aryl group containing 6 to 20 carbon atoms or an aralkyl group containing 7 to 20 carbon atoms and preferably is an alkyl group containing 1 to 10 carbon atoms or a phenyl group. Particularly preferred as $R^{23}$ and $R^{24}$ are —$CO_2R$, —C(O)R and —CN.

(e) The process which comprises reacting a vinyl polymer having at least one carbon-halogen bond represented by the general formula (3) as obtained by atom transfer radical polymerization with a simple substance metal, such as zinc, or an organometal compound and then reacting the thus-prepared enolate anion with an aldehyde or ketone.

(f) The process which comprises reacting a vinyl polymer having at least one terminal halogen, preferably a halogen represented by the general formula (3), with a hydroxyl-containing oxyanion represented by the general formula (15) shown below or the like or a hydroxyl-containing carboxylate anion represented by the general formula (16) shown below or the like to thereby substitute a hydroxyl-containing substituent for the above halogen:

$$HO\text{---}R^{18}\text{---}O^-M^+ \tag{15}$$

wherein $R^{18}$ and $M^+$ are as defined above;

$$HO\text{---}R^{18}\text{---}C(O)O^-M^+ \tag{16}$$

wherein $R^{18}$ and $M^+$ are as defined above.

In the practice of the invention, when any halogen is not directly involved in the method comprising introducing a hydroxyl group, as in the processes (a) and (b), the process (b) is comparatively more preferred since the control is easier. In cases where the hydroxyl group introduction is introduced by converting the halogen of a vinyl polymer having at least one carbon-halogen bond, as in the processes (c) to (f), the process (f) is comparatively more preferred since the control is easier.

<Introduction ③ of a Terminal Hydroxyl Group for Polymer (I)>

The process ③ is now described.

③ The process which comprises reacting a vinyl polymer having a hydroxyl group at a molecular chain terminus with a diisocyanate compound and causing the residual unreacted isocyanato group to react with a compound of the general formula (5).

$$HO\text{-}Q\text{-}C(O)CR^1\text{=}CR^2R^3 \tag{5}$$

[wherein $R^1$, $R^2$ and $R^3$ are as defined hereinbefore; Q represents a bivalent organic group containing 2 to 20 carbon atoms]

Referring to the above general formula (5), Q includes but is not limited to:

—$(CH_2)_n$— (n being an integer of 1 to 20); —$CH(CH_3)$—, —$CH(CH_2CH_3)$—, —$C(CH_3)_2$—, —$C(CH_3)(CH_2CH_3)$—, —$C(CH_2CH_3)_2$—, —$CH_2CH(CH_3)$—; —$(CH_2)_n$—O— (n being an integer of 1 to 20); —$CH(CH_3)$—O—, —$CH(CH_2CH_3)$—O—, —$C(CH_3)_2$—O—, —$C(CH_3)(CH_2CH_3)$—O—, —$C(CH_2CH_3)_2$—O—; —$(CH_2)_n$—O—$CH_2$— (n being an integer of 1 to 19); —$CH(CH_3)$—O—$CH_2$—, —$CH(CH_2CH_3)$—O—$CH_2$—, —$C(CH_3)_2$—O—$CH_2$—O—$C(CH_3)(CH_2CH_3)$—O—$CH_2$—, —$C(CH_2CH_3)_2$—O—$CH_2$—, —$(CH_2)_n$—OC(O)—; —$(CH_2)_n$—OC(O)—$(CH_2)_m$— (m and n being the same or different and each being an integer of 0 to 19, provided that the relation $0 \leq m+n \leq 19$ should be satisfied);

—$(CH_2)_n$—C(O)O—$(CH_2)_m$— (m and n being the same or different and each being an integer of 0 to 19, provided that the relation $0 \leq m+n \leq 19$ should be satisfied); —$CH_2$—C(O)O—$(CH_2)_2$—O—$CH_2$—, —CH($CH_3$)—C(O)O—$(CH_2)_2$—O—$CH_2$—, —CH($CH_2CH_3$)—C(O)O—$(CH_2)_2$—O—, —$C(CH_3)_2$—C(O)O—, —$C(CH_3)(CH_2CH_3)$—C(O)O—, —$C(CH_2CH_3)_2$—C(O)O— and the like.

Further Q may contain a benzene ring. As specific examples of that case, there may be mentioned o-, m- or p-$C_6H_4$—, o-, m- or p-$C_6H_4$—$CH_2$—, o-, m- or p-$C_6H_4$—O—, o-, m- or p-$C_6H_4$—O—$CH_2$—, o-, m- or p-$C_6H_4$—O—$CH(CH_3)$—, o-, m- or p-$C_6H_4$—O—$C(CH_3)_2$—; o-, m- or p-$C_6H_4$—($CH_2$)— (n being an integer of 0 to 14); o-, m- or p-$C_6H_4$—O—$(CH_2)_n$— (n being an integer of 0 to 14); o-, m- or p-$CH_2$—$C_6H_4$—, o-, m- or p-$CH_2$—$C_6H_4$—$CH_2$—, o-, m- or p-$CH_2$—$C_6H_4$—O—, o-, m- or p-$CH_2$—$C_6H_4$—O—$CH_2$—, o-, m- or p-$CH_2$—$C_6H_4$—O—$CH(CH_3)$—; o-, m- or p-$CH_2$—$C_6H_4$—O—$C(CH_3)_2$—; o-, m- or p-$CH_2$—$C_6H_4$—($CH_2)_n$— (n being an integer of 0 to 13); o-, m- or p-$CH_2$—$C_6H_4$—O—$(CH_2)_n$— (n being an integer of 0 to 13); o-, m- or p-$C_6H_4$—C(O)O—, o-, m- or p-$CH_2$—$C_6H_4$—C(O)O—; o-, m- or p-C(O)—$C_6H_4$—C(O)O—$(CH_2)_n$— (n being an integer of 0 to 12) and the like.

The hydroxyl-terminated vinyl monomer is as described above.

The diisocyanate compound for use is not particularly restricted and may be any of the hitherto-known isocyanates, such as toluylene diisocyanate, 4,4'-diphenylmethane diisocyanate, hexamethyl diisocyanate, xylylene diisocyanate, m-xylylene diisocyanate, 1,5-naphthalene diisocyanate, hydrogenated diphenylmethane diisocyanate, hydrogenated toluylene diisocyanate, hydrogenated xylylene diisocyanate, isophorone diisocyanate, and so on. These may be used each independently or two or more of them may be used in combination. Blocked isocyanates may also be used.

As the polyisocyanate for insuring more improved weather resistance, it is preferable to use a aromatic ring-free diisocyanate compound such as hexamethylene diisocyanate and hydrogenated diphenylmethane diisocyanate.

<Introduction ④ of a Terminal Functional Group for Polymer (I)>

The process ④ is now described.

④ The process which comprises reacting a vinyl polymer (II) having a silanol group at at least one molecular chain terminus with a silicon compound of the general formula (6).

$$X'SiR''_2\text{-}G\text{-}C(O)CR^1\text{=}CR^2R^3 \tag{6}$$

[wherein $R^1$, $R^2$ and $R^3$ are as defined hereinbefore; $R^{10}$ represents a hydrocarbon group containing 1 to 14 carbon atoms or a halogenated hydrocarbon group containing 1 to 10 carbon atoms; the plurality of R" may be the same or different; X' represents a hydrolyzable group; G represents an oxyalkylene group containing 1 to 4 carbon atoms]

The vinyl polymer (II) having a silanol group at at least one terminus [hereinafter sometimes referred to briefly as polymer (II)] is now described.

The silanol group of polymer (II) is not restricted but includes groups which may be represented by the general formula (7).

$$—[Si(R^5)_{2-b}(OH)_bO]_m—Si(R^6)_{3-a}(OH)_a \quad (7)$$

[wherein $R^5$ and $R^6$ each represents an alkyl group containing 1 to 20 carbon atoms, an aryl group containing 6 to 20 carbon atoms, an aralkyl group containing 7 to 20 carbon atoms, or a triorganosiloxy group of the formula (R')$_3$Si— (where R' represents a univalent hydrocarbon group containing 1 to 20 carbon atoms and the three R' groups may be the same or different); when $R^5$ or $R^6$ occurs in the number of 2 or more, the plurality of groups may be the same or different; a represents 0, 1, 2 or 3; b represents 0, 1 or 2; m is an integer of 0 to 19; provide, however, that the relation of a+mb$\geq$1 is satisfied]

Though this is not an exclusive choice, the silanol group of the general formula (7) wherein m=0 is preferred.

$R^5$ and $R^6$ include but are not limited to the following groups:

—(CH$_2$)$_n$—CH$_3$, —CH(CH$_3$)—(CH$_2$)$_n$—CH$_3$, —CH(CH$_2$CH$_3$)—(CH$_2$)$_n$—CH$_3$, —CH(CH$_2$CH$_3$)$_2$, —C(CH$_3$)$_2$—(CH$_2$)$_n$—CH$_3$, —C(CH$_3$)(CH$_2$CH$_3$)—(CH$_2$)$_n$—CH$_3$, —C$_6$H$_5$—, —C$_6$H$_5$(CH$_3$), —C$_6$H$_5$(CH$_3$)$_2$, —(CH$_2$)$_n$—C$_6$H$_5$, —(CH$_2$)$_n$—C$_6$H$_5$(CH$_3$), —(CH$_2$)$_n$—C$_6$H$_5$(CH$_3$)$_2$ (n is an integer of 0 or more; the total number of carbon atoms in each group is up to 20 at the maximum)

More specifically, the preferred silanol group of polymer (II) is —Si(CH$_3$)$_2$OH.

A typical technology of producing a vinyl polymer (II) having a silanol group at at least one terminus is now described below. However, this is not limited thereto. For information on suitable processes for synthesizing a silanol-containing polymer, reference may be made to P. D. Lickiss' article in Advances in Inorganic Chemistry, Vol. 42, p. 142 (1995).

The basic method of producing said polymer (II) comprises polymerizing a vinyl monomer, introducing an alkenyl group into the terminus of the polymer in some way or other, subjecting it to hydrosilylation with a silicon compound having both a hydrolyzable group and a hydrosilyl group, hydrolyzing said hydrolyzable group for conversion to a silanol group.

This method is now described in detail.

Alkenyl Group Introduction

The method of producing a vinyl polymer having at least one alkenyl group at a terminus is not limited to the above method using an alkenyl-containing initiator but includes the following methods (A) to (C), for instance.

(A) The method comprising directly introducing an alkenyl group into the polymer main chain on the occasion of synthesizing a vinyl polymer by radical polymerization.

(B) The method comprising using a vinyl polymer having at least one halogen and substituting an alkenyl-containing functional group for this halogen. The halogen group is not restricted but is preferably represented by the general formula (3):

$$—C(R^{22})(R^{23})(X) \quad (3)$$

wherein $R^{22}$ and $R^{23}$ each represents a group bound to an ethylenically unsaturated group of the vinyl monomer and X represents a chlorine, bromine or iodine atom.

(C) The method comprising using a vinyl polymer having at least one hydroxyl group and substituting an alkenyl-containing functional group for this hydroxyl group.

Referring to the above method of synthesis (A), the process for directly introducing an alkenyl group into the polymer main chain is not particularly restricted but specifically includes, among others, the processes (A-a) and (A-b) mentioned below.

(A-a) The process which comprises subjecting a compound having both a polymerizable alkenyl group and a sparingly polymerizable alkenyl group per molecule as represented by the following general formula (17) to reaction together with a predetermined vinyl monomer on the occasion of synthesizing a vinyl polymer by living radical polymerization:

$$H_2C=C(R^{15})—R^{16}—R^{17}—C(R^{15})=CH_2 \quad (17)$$

wherein $R^{15}$ is as defined above, $R^{16}$ represents a —C(O)O— (ester) group or an o-, m- or p-phenylene group, $R^{17}$ represents a direct bond or a bivalent C$_{1-20}$ organic group optionally containing one or more ether bonds. When $R^{16}$ is an ester group, the compound is a (meth) acrylate compound and, when $R^{16}$ is a phenylene group, the compound is a styrenic compound.

As examples of $R^{17}$ in the above general formula (17), there may be mentioned alkylene groups such as methylene, ethylene and propylene; o-, m- and p-phenylene; aralkyl groups such as benzyl; and ether bond-containing alkylene groups such as —CH$_2$CH$_2$—O—CH$_2$— and —O—CH$_2$—.

Among the compounds of the general formula (17), the following are preferred because of ready availability:

H$_2$C=C(H)C(O)O(CH$_2$)$_n$—CH=CH$_2$, H$_2$C=C(CH$_3$)C(O)O(CH$_2$)$_n$—CH=CH$_2$ (in the above formulas, n represents an integer of 0 to 20), H$_2$C=C(H)C(O)O(CH$_2$)$_n$—O—(CH$_2$)$_m$CH=CH$_2$, H$_2$C=C(CH$_3$)C(O)O(CH$_2$)$_n$—O—(CH$_2$)$_m$CH=CH$_2$ (in the above formulas, n represents an integer of 1 to 20 and m represents an integer of 0 to 20), o-, m-, p-divinylbenzene, o-, m-, p-H$_2$C=CH—C$_6$H$_4$—CH$_2$CH=CH$_2$, o, m, p-H$_2$C=CH—C$_6$H$_4$—CH$_2$—C(CH$_3$)=CH$_2$, o, m, p-H$_2$C=CH—C$_6$H$_4$—CH$_2$CH$_2$CH=CH$_2$, o, m, p-H$_2$C=CH—C$_6$H$_4$—OCH$_2$CH=CH$_2$, o, m, p-H$_2$C=CH—C$_6$H$_4$—OCH$_2$—C(CH$_3$)=CH$_2$, o, m, p-H$_2$C=CH—C$_6$H$_4$—OCH$_2$CH$_2$CH=CH$_2$, o, m, p-H$_2$C=C(CH$_3$)—C$_6$H$_4$—C(CH$_3$)=CH$_2$, o, m, p-H$_2$C=C(CH$_3$)—C$_6$H$_4$—CH$_2$CH=CH$_2$, o, m, p-H$_2$C=C(CH$_3$)—C$_6$H$_4$—CH$_2$C(CH$_3$)=CH$_2$, o, m, p-H$_2$C=C(CH$_3$)—C$_6$H$_4$—CH$_2$CH$_2$CH=CH$_2$, o, m, p-H$_2$C=C(CH$_3$)—C$_6$H$_4$—OCH$_2$CH=CH$_2$, o, m, p-H$_2$C=C(CH$_3$)—C$_6$H$_4$—OCH$_2$—C(CH$_3$)=CH$_2$, and o, m, p-H$_2$C=C(CH$_3$)—C$_6$H$_4$—OCH$_2$CH$_2$CH=CH$_2$ (in the above formulas, C$_6$H$_4$ represents a phenylene group)

The timing of reacting the compound having both a polymerizable alkenyl compound and a sparingly polymerizable alkenyl group is not particularly restricted. Preferably, however, it is subjected to reaction as a second monomer at the final stage of the polymerization reaction or after completion of the reaction involving a predetermined monomer(s) in the living radical polymerization.

(A-b) The process which comprises subjecting a compound having at least two sparingly polymerizable alkenyl groups to reaction as a second monomer at the final stage of the polymerization reaction or after completion of the reaction involving a predetermined monomer(s) in synthesizing a vinyl polymer by living radical polymerization.

Such compound is not particularly restricted but includes, among others, compounds represented by the general formula (18):

$$H_2C=C(R^{15})-R^{18}-C(R^{15})=CH_2 \quad (18)$$

wherein $R^{15}$ is as defined above, $R^{18}$ represents a bivalent organic group containing 1 to 20 carbon atoms, which may optionally contain one or more ether bonds.

The compound represented by the above general formula (18) is not particularly restricted. Preferred are, however, 1,5-hexadiene, 1,7-octadiene and 1,9-decadiene in view of their ready availability.

Among the variations of the above synthetic method (A) for synthesizing a vinyl polymer having at least one alkenyl group which comprises directly introducing the alkenyl group into the polymer main chain, the method (A-b) is preferred since the number of alkenyl groups introduced per polymer molecule can be controlled more easily.

The above method (B) for synthesizing a vinyl polymer having at least one halogen atom, preferably the halogen atom represented by the general formula (3) at the polymer terminus is preferably carried out in the manner of atom transfer living polymerization. The method of substituting an alkenyl-containing functional group for the halogen atom of that polymer is not particularly restricted but specifically includes, among others, the processes (B-a) to (B-d) described below.

(B-a) The process which comprises reacting a vinyl polymer having at least one halogen atom, preferably a halogen atom represented by the general formula (3) at the polymer terminus with one of various alkenyl-containing organometal compounds to thereby substitute the alkenyl for the halogen.

As such organometal compounds, there may be mentioned organolithium, organosodium, organopotassium, organomagnesium, organotin, organosilicon, organozinc, organocopper and like compounds. In particular, organotin and organocopper compounds are preferred since they react selectively with the halogen represented by the general formula (3) and are low in reactivity with a carbonyl group.

The alkenyl-containing organotin compound is not particularly restricted but compounds represented by the general formula (19):

$$H_2C=C(R^{15})C(R^{19})(R^{20})Sn(R^{21})_3 \quad (19)$$

wherein $R^{15}$ is as defined above, $R^{19}$ and $R^{20}$ each represents a hydrogen atom, an alkyl group containing 1 to 10 carbon atoms, an aryl group containing 6 to 10 carbon atoms or an aralkyl group containing 7 to 10 carbon atoms and they may be the same or different, $R^{21}$ represents a $C_1$-$C_{10}$ alkyl, aryl or aralkyl group.

As specific examples of the organotin compound of the above general formula (19), there may be mentioned allyltributyltin, allyltrimethyltin, allyltri(n-octyl)tin and allyltri(cyclohexyl)tin. As examples of the alkenyl-containing organocopper compound, there may be mentioned divinylcopper-lithium, diallylcopper-lithium and diisopropenylcopper-lithium.

(B-b) The process which comprises reacting a vinyl polymer having at least one halogen atom, preferably a halogen atom represented by the general formula (3) at the polymer terminus, with a stabilized alkenyl-containing carbanion represented by the following general formula (20), for instance, to thereby substitute the alkenyl for the halogen:

$$M^+C^-(R^{23})(R^{24})-R^{18}-C(R^{15})=CH_2 \quad (20)$$

wherein $R^{15}$ and $R^{18}$ are as defined above. $R^{23}$ and $R^{24}$ each represents an electron-attracting group stabilizing the carbanion $C^-$ or one of them represents such an electron-attracting group and the other represents a hydrogen atom, an alkyl group containing 1 to 10 carbon atoms or a phenyl group. As the electron-attracting group $R^{23}$ and/or $R^{24}$, there may be mentioned —$CO_2R$ (ester group), —C(O)R (keto group), —$CON(R_2)$ (amide group), —COSR (thioester group), —CN (nitrile group) and —$NO_2$ (nitro group), among others. The substituent R is an alkyl group containing 1 to 20 carbon atoms, an aryl group containing 6 to 20 carbon atoms or an aralkyl group containing 7 to 20 carbon atoms and preferably is an alkyl group containing 1 to 10 carbon atoms or a phenyl group. Particularly preferred as $R^{23}$ and $R^{24}$ are —$CO_2R$, —C(O)R and —CN. $M^+$ represents an alkali metal ion or a quaternary ammonium ion.

As the alkali metal ion, there may be mentioned the lithium ion, sodium ion and potassium ion and, as the quaternary ammonium ion, there may be mentioned the tetramethylammonium ion, tetraethylammonium ion, trimethylbenzylammonium ion, trimethyldodecylammonium ion and tetrabutylammonium ion.

The carbanion of the general formula (20) can be obtained by reacting a precursor thereof with a basic compound to thereby withdraw the active proton.

As examples of the precursor of the carbanion of the general formula (20), there may be mentioned the following compounds:

$H_2C=CH-CH(CO_2CH_3)_2$, $H_2C=CH-CH(CO_2C_2H_5)_2$, $H_2C=CH-(CH_2)_nCH(CO_2CH_3)_2$, $H_2C=CH-(CH_2)_nCH(CO_2C_2H_5)_2$, o-, m-, p-$H_2C=CH-C_6H_4-CH(CO_2CH_3)_2$, o-, m-, p-$H_2C=CH-C_6H_4-CH(CO_2C_2H_5)_2$, o-, m-, p-$H_2C=CH-C_6H_4-CH_2CH(CO_2CH_3)_2$, o-, m-, p-$H_2C=CH-C_6H_4-CH_2CH(CO_2C_2H_5)_2$, $H_2C=CH-CH(C(O)CH_3)(CO_2C_2H_5)$, $H_2C=CH-(CH_2)_nCH(C(O)CH_3)(CO_2C_2H_5)$, o-, m-, p-$H_2C=CH-C_6H_4-CH(C(O)CH_3)(CO_2C_2H_5)$, o-, m-, p-$H_2C=CH-C_6H_4-CH_2CH(C(O)CH_3)(CO_2C_2H_5)$, $H_2C=CH-CH(C(O)CH_3)_2$, $H_2C=CH-(CH_2)_nCH(C(O)CH_3)_2$, o-, m-, p-$H_2C=CH-C_6H_4-CH(C(O)CH_3)_2$, o-, m-, p-$H_2C=CH-C_6H_4-CH_2CH(C(O)CH_3)_2$, $H_2C=CH-CH(CN)(CO_2C_2H_5)$, $H_2C=CH-(CH_2)_nCH(CN)(CO_2C_2H_5)$, o-, m-, p-$H_2C=CH-C_6H_4-CH(CN)(CO_2C_2H_5)$, o-, m-, p-$H_2C=CH-C_6H_4-CH_2CH(CN)(CO_2C_2H_5)$, $H_2C=CH-CH(CN)_2$, $H_2C=CH-(CH_2)_nCH(CN)_2$, o-, m-, p-$H_2C=CH-C_6H_4-CH(CN)_2$, o-, m-, p-$H_2C=CH-C_6H_4-CH_2CH(CN)_2$, $H_2C=CH-(CH_2)_nNO_2$, o-, m-, p-$H_2C=CH-C_6H_4-CH_2NO_2$, o-, m-, p-$H_2C=CH-C_6H_4-CH_2CH_2NO_2$, $H_2C=CH-CH(C_6H_5)(CO_2C_2H_5)$, $H_2C=CH-(CH_2)_nCH(C_6H_5)(CO_2C_2H_5)$, o-, m-, p-$H_2C=CH-C_6H_4-CH(C_6H_5)(CO_2C_2H_5)$, o-, m-, p-$H_2C=CH-C_6H_4-CH_2CH(C_6H_5)(CO_2C_2H_5)$ (in the above formulas, n represents an integer of 1 to 10).

For withdrawing a proton from the above compound to give the carbanion of the general formula (20), various basic compounds are usable. As such basic compounds, there may be mentioned the following:

Alkali metals such as sodium, potassium and lithium; metal alkoxides such as sodium methoxide, potassium methoxide, lithium methoxide, sodium ethoxide, potassium ethoxide, lithium ethoxide, sodium tert-butoxide and potassium tert-butoxide; carbonates such as sodium carbonate, potassium carbonate, lithium carbonate and sodium hydrogen carbonate; hydroxides such as sodium hydroxide and potassium hydroxide; hydrides such as sodium hydride, potassium hydride, methyllithium and ethyllithium; organometals such as n-butyllithium, tert-butyllithium, lithium diisopropylamide and lithium hexamethyldisilazide; ammonia; alkylamines such as trimethylamine, triethylamine and tributylamine; polyamines such as tetramethylethylenediamine and pentamethyl-diethylenetriamine; and pyridine compounds such as pyridine and picoline; among others.

The basic compound is used in an equivalent amount or in a slight excess relative to the precursor substance, preferably in an amount of 1 to 1.2 equivalents.

A quaternary ammonium salt may also be used as the above carbanion. In this case, it can be obtained by preparing an alkali metal salt of a carboxylic acid compound and reacting this with a quaternary ammonium halide. As examples of the quaternary ammonium halide, there may be mentioned tetramethylammonium halides, tetraethylammonium halides, trimethylbenzylammonium halides, trimethyldodecylammonium halides and tetrabutylammonium halides.

As the solvent to be used in reacting the above precursor with a basic compound, there may be mentioned hydrocarbon solvents such as benzene and toluene; ether solvents such as diethyl ether, tetrahydrofuran, diphenyl ether, anisole and dimethoxybenzene; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; sulfoxide solvents such as dimethyl sulfoxide; and so on. These may be used singly or two or more of them may be used in admixture.

By reacting the above precursor with a basic compound, a carbanion represented by the general formula (20) is prepared and, by reacting the same with a vinyl polymer having a terminal halogen atom, preferably a halogen represented by the general formula (3), the desired alkenyl-terminated vinyl polymer can be obtained.

(B-c) The process which comprises reacting a vinyl polymer having at least one halogen atom, preferably a halogen atom represented by the general formula (3) at the polymer terminus with a simple substance metal or an organometal compound to thereby form an enolate anion and then reacting it with an alkenyl-containing electrophilic compound.

Particularly preferred as the simple substance metal is zinc, since the resulting enolate anion will not attack other ester groups or hardly undergo such side reactions as rearrangement. Various species can be used as the alkenyl-containing electrophilic compound, for example alkenyl-containing compounds having a leaving group such as a halogen and an acetyl group, alkenyl-containing carbonyl compounds, alkenyl-containing isocyanate compounds and alkenyl-containing acid halides. Among these, alkenyl-containing compounds having a leaving group such as a halogen and an acetyl group are preferred since when they are used, no other atoms than carbon atoms are introduced into the main chain, hence the vinyl polymer will not lose its weathering resistance.

(B-d) The process comprising reacting a vinyl polymer having at least one halogen atom, preferably a halogen represented by the general formula (3) at the polymer terminus, with an alkenyl-containing oxyanion represented by the general formula (21) given below or an alkenyl-containing carboxylate anion represented by the general formula (22) given below to thereby substitute the alkenyl group for the above halogen:

$$CH_2=C(R^{15})-R^{18}-O^-M^+ \quad (21)$$

wherein $R^{15}$, $R^{18}$ and $M^+$ are as defined above;

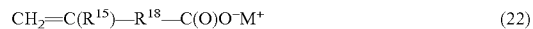

$$CH_2=C(R^{15})-R^{18}-C(O)O^-M^+ \quad (22)$$

wherein $R^{15}$, $R^{18}$ and $M^+$ are as defined above.

As the precursor of the oxyanion represented by the general formula (21) or (22), there may be mentioned the following compounds:

Alcoholic hydroxyl-containing compounds such as $H_2C=CH-CH_2-OH$, $H_2C=CH-CH(CH_3)-OH$, $H_2C=C(CH_3)-CH_2-OH$, $H_2C=CH-(CH_2)_n-OH$ (n being an integer of 2 to 20), $H_2C=CH-CH_2-O-(CH_2)_2-OH$, $H_2C=CH-C(O)O-(CH_2)_2-OH$, $H_2C=C(CH_3)-C(O)O-(CH_2)_2-OH$, o-, m-, p-$H_2C=CH-C_6H_4-CH_2-OH$, o-, m-, p-$H_2C=CH-CH_2-C_6H_4-CH_2-OH$, o-, m-, p-$H_2C=CH-CH_2-O-C_6H_4-CH_2-OH$; phenolic hydroxyl-containing compounds such as o-, m-, p-$H_2C=CH-C_6H_4-OH$, o-, m-, p-$H_2C=CH-CH_2-C_6H_4-OH$, o-, m-, p-$H_2C=CH-CH_2-O-C_6H_4-OH$; carboxyl-containing compounds such as $H_2C=CH-C(O)-OH$, $H_2C=C(CH_3)-C(O)-OH$, $H_2C=CH-CH_2-C(O)-OH$, $H_2C=CH-(CH_2)_n-C(O)-OH$ (n being an integer of 2 to 20), $H_2C=CH-(CH_2)_n-OC(O)-(CH_2)_m-C(O)-OH$ (m and n being the same or different and each being an integer of 0 to 19), o-, m-, p-$H_2C=CH-C_6H_4-C(O)-OH$, o-, m-, p-$H_2C=CH-CH_2-C_6H_4-C(O)-OH$, o-, m-, p-$H_2C=CH-CH_2-O-C_6H_4-C(O)-OH$, o-, m-, p-$H_2C=CH-(CH_2)_n-OC(O)-C_6H_4-C(O)-OH$ (n being an integer of 0 to 13); and the like.

For withdrawing a proton from the above compound to give an anion of the general formula (21) or (22), one of various basic compounds is used. As specific examples thereof, those basic compounds which are mentioned hereinabove for use in preparing the carbanion of the general formula (20) are all suited for use. As for the reaction solvent, all the reaction solvents usable in preparing the carbanion can appropriately be used.

Among the variations of the synthetic method (B), since the alkenyl group introduction can be realized at a high rate, preferred is the method (B-d) which comprises being subjected a vinyl polymer at least one halogen atom, preferably a halogen atom represented by the general formula (3) at the polymer terminus, as obtained by atom transfer radical polymerization using an organic halide or halogenated sulfonyl compound as an initiator and a transition metal complex as a catalyst, to halogen conversion. Among the variations of the method (B-d), the method comprising reacting the polymer with an alkenyl-containing carboxylate anion represented by the general formula 22 or the like is more preferred.

When, in the process for producing a vinyl polymer which comprises using the atom transfer radical polymerization technique for polymerizing a vinyl monomer(s) with an organic halide or halogenated sulfonyl compound as an initiator and a transition metal complex as a catalyst, an alkenyl-containing organic halide is used as the initiator, a vinyl polymer having the alkenyl group at one terminus and the halogen atom, preferably represented by the general formula (3), at the other terminus can be obtained. When the termination terminus halogen of the thus-obtained polymer is converted to an alkenyl-containing substituent, a vinyl polymer having the respective alkenyl groups at the respective terminus can be obtained. As the method of conversion, the methods already described hereinabove can be used.

As the alkenyl-containing initiator, the compounds mentioned hereinbefore can be used with advantage.

The alkenyl-terminated vinyl polymer can also be produced by coupling the halogen termini to each other using a compound having a total of 2 or more functional groups, either the same or different, each of which is capable of replacing the halogen of the polymer.

The compound having a total of at least two functional groups which are the same or different and may substitute for the terminal halogen is not particularly restricted but preferably includes polyols, polyamines, polycarboxylic acids, polythiols, and salts thereof, and alkali metal sulfides, among others. Specific examples of these compounds are as follows:

Polyols such as ethylene glycol, 1,2-propanediol, 1,3-propanediol, 2-methyl-1,3-propanediol, 2,2-dimethyl-1,3-propanediol, 1,4-butanediol, 1,3-butanediol, 1,2-butanediol, 2,3-butanediol, pinacol, 1,5-pentanediol, 1,4-pentanediol, 2,4-pentanediol, 1,6-hexanediol, 1,7-heptanediol, 1,8-octanediol, 1,9-nonanediol, 1,10-decanediol, 1,12-dodecanediol, 1,2-cyclopentanediol, 1,3-cyclopentanediol, 1,2-cyclohexanediol, 1,3-cyclohexanediol, 1,4-cyclohexanediol, glycerol, 1,2,4-butanetriol, catechol, resorcinol, hydroquinone, 1,2-dihydroxynaphthalene, 1,3-dihydroxynaphthalene, 1,5-dihydroxynaphthalene, 2,6-dihydroxynaphthalene, 2,2'-biphenol, 4,4'-biphenol, bis(4-hydroxyphenyl) methane, 4,4'-isopropylidenephenol, 3,3'-(ethylenedioxy) diphenol, α,α'-dihydroxy-p-xylene, 1,1,1-tris (4-hydroxyphenyl)ethane, pyrogallol and 1,2,4-benzenetriol; and alkali metal salts of the polyol compounds mentioned above;

Polyamines such as ethylenediamine, 1,3-diaminopropane, 1,2-diaminopropane, 1,4-diaminobutane, 1,2-diamino-2-methylpropane, 1,5-diaminopentane, 2,2-dimethyl-1,3-propanediamine, 1,6-hexanediamine, 1,7-heptanediamine, 1,8-octanediamine, 1,9-diaminononane, 1,10-diaminodecane, 1,12-diaminododecane, 4,4'-methylenebis(cyclohexylamine), 1,2-diaminocyclohexane, 1,3-diaminocyclohexane, 1,4-diaminocyclohexane, 1,2-phenylenediamine, 1,3-phenylenediamine, 1,4-phenylenediamine and α,α'-diamino-p-xylene; and alkali metal salts of the polyamine compounds mentioned above;

Polycarboxylic acids such as oxalic acid, malonic acid, methylmalonic acid, dimethylmalonic acid, succinic acid, methylsuccinic acid, glutaric acid, adipic acid, 1,7-heptanedicarboxylic acid, 1,8-octanedicarboxylic acid, 1,9-nonanedicarboxylic acid, 1,10-decanedicarboxylic acid, 1,11-undecanedicarboxylic acid, 1,12-dodecanedicarboxylic acid, 1,2-cyclopentanedicarboxylic acid, 1,2-cyclohexanedicarboxylic acid, 1,3-cyclohexanedicarboxylic acid, 1,4-cyclohexanedicarboxylic acid, 1,3,5-cyclohexanetricarboxylic acid, phthalic acid, isophthalic acid, terephthalic acid, 1,2,3-benzenetricarboxylic acid and 1,2,4,5-benzenetetracarboxylic acid; and alkali metal salts of the polycarboxylic acids mentioned above;

Polythiols such as 1,2-ethanedithiol, 1,3-propanedithiol, 1,4-butanedithiol, 2,3-butanedithiol, 1,5-pentanedithiol, 1,6-hexanedithiol, 1,7-heptanedithiol, 1,8-octanedithiol, 1,9-nonanedithiol, 2-mercaptoethyl ether, p-xylene-α,α'-dithiol, 1,2-benzenedithiol, 1,3-benzenedithiol and 1,4-benzenedithiol; and alkali metal salts of the polythiols mentioned above;

Lithium sulfide, sodium sulfide and potassium sulfide.

When the above polyols, polyamines, polycarboxylic acids or polythiols are used, a basic compound is combinedly used for promoting the substitution reaction and, as specific examples, there may be mentioned those already mentioned hereinabove.

The synthetic method (C) mentioned above which comprises using a vinyl polymer having at least one hydroxyl group and substituting an alkenyl-containing functional group for this hydroxyl group is not particularly restricted but specifically includes, among others, the processes (C-a) to (C-d) mentioned below.

The vinyl polymer having at least one hydroxyl group can be obtained by the processes described above.

(C-a) The process comprising reacting a hydroxyl group of a vinyl polymer having at least one hydroxyl group with a base, such as sodium hydroxide or sodium methoxide, followed by reacting with an alkenyl-containing halide, such as allyl chloride.

(C-b) The process comprising reacting a vinyl polymer having at least one hydroxyl group with an alkenyl-containing isocyanate compound, such as allyl isocyanate.

(C-c) The process comprising reacting a vinyl polymer having at least one hydroxyl group with an alkenyl-containing acid halide, such as (meth)acrylic acid chloride, in the presence of a base, such as pyridine.

(C-d) The process comprising reacting a vinyl polymer having at least one hydroxyl group with an alkenyl-containing carboxylic acid, such as acrylic acid, in the presence of an acid catalyst.

Hydrosilylation Reaction

By subjecting the alkenyl-terminated polymer produced in the above manner to hydrosilylation reaction using a silicon compound having both a hydrolyzable group and a hydrosilyl group, the hydrosilyl group can be introduced terminally into the polymer.

The silicon compound having both a hydrolyzable group and a hydrosilyl group is not particularly restricted but includes compounds represented by the general formula (23):

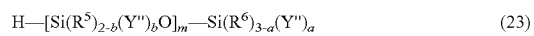

$$H-[Si(R^5)_{2-b}(Y'')_bO]_m-Si(R^6)_{3-a}(Y'')_a \quad (23)$$

wherein $R^5$ and $R^6$ each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which R' is a univalent hydrocarbon group containing 1 to 20 carbon atoms and the three R' groups may be the same or different) and, when there are two or more $R^5$ or $R^6$ groups, they may be the same or different, Y'' represents a hydrolyzable group other than a hydroxyl group, a represents 0, 1, 2 or 3, b represents 0, 1 or 2 and m is an integer of 0 to 19 provided that the relation $a+mb \leq 1$ should be satisfied. Among them, those in which m is 0 are preferred.

Y'' is not particularly restricted but includes, among others, ketoximo, acyloxy, alkoxy, amido, aminoxy, amino, alkenoxy and halogen groups and a hydrogen atom. Among them, halogen groups are preferred.

As more specific and preferred examples of such silicon compound, there may be mentioned dialkylchlorosilanes, in particular chlorodimethylsilane.

The amount of the silicon compound having both a hydrolyzable group and a hydrosilyl group which is to be reacted with the alkenyl-terminated polymer is not particularly restricted but, when a compound having only one hydrosilyl group is used, the amount thereof may be equivalent relative to the alkenyl group. When a compound having a plurality of hydrosilyl groups is used, there is the possibility of coupling thereof by the hydrosilylation reaction and, therefore, the compound is preferably used in excess.

For causing the hydrosilylation reaction to proceed rapidly, a hydrosilylation catalyst may be added. As such hydrosilylation catalyst, there may be mentioned a radical initiator such as an organic peroxide and an azo compound, and a transition metal catalyst.

The radical initiator is not particularly restricted but may be any of various compounds. As examples, there may be mentioned dialkyl peroxides such as di-tert-butyl peroxide, 2,5-dimethyl-2,5-di(tert-butylperoxy)hexane, 2,5-dimethyl-2,5-di (tert-butylperoxy)-3-hexyne, dicumyl peroxide, tert-butylcumyl peroxide and α,α'-bis(tert-butylperoxy) isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide, peresters such as tert-butyl perbenzoate, peroxydicarbonates such as diisopropyl peroxydicarbonate and di-2-ethylhexyl peroxydicarbonate, and peroxyketals such as 1,1-di(tert-butylperoxy) cyclohexane and 1,1-di(tert-butylperoxy)-3,3,5-trimethylcyclohexane, among others.

As the transition metal catalyst, there may be mentioned, for example, simple substance platinum, solid platinum dispersed on a support such as alumina, silica and carbon black, chloroplatinic acid, complexes of chloroplatinic acid with alcohols, aldehydes, ketones or the like, platinum-olefin complexes and platinum(0)-divinyltetramethyldisiloxane complex. As examples of the catalyst other than platinum compounds, there may be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$, $TiCl_4$, etc. These catalysts may be used singly or two or more of them may be used combinedly. The amount of the catalyst is not particularly restricted but recommendably is within the range of $10^{-1}$ to $10^{-8}$ mole, preferably within the range of $10^{-3}$ to $10^{-6}$ mole, per mole of the alkenyl group of the component (A). When it is less than $10^{-8}$ mole, the curing may not proceed to a sufficient extent. Since the hydrosilylation catalyst is expensive, it is recommendable that this catalyst is not used in an amount exceeding $10^{-1}$ mole.

The hydrosilylation reaction may be conducted without using any solvent or in the presence of a solvent. Ordinary organic solvents, such as hydrocarbon solvents, ether solvents and ester solvents, can be used as the solvent. However, those capable of serving as ligands of transition metals, for example amines and phosphines, may possibly lower the catalytic activity, hence are undesirable, when a transition metal catalyst is used.

The hydrosilylation reaction temperature is not particularly restricted but the reaction is generally carried out at 0 to 250° C., preferably 20 to 150° C., most preferably 40 to 120° C.

<Hydrolysis Reaction>

The silyl group having a hydrolyzable group at the polymer terminus produced in the above manner can be hydrolyzed to give a polymer having a silanol group.

When the hydrolyzable group is a hydrogen, the hydrolysis can be effected by a method known in the art, which is not restricted, for example by reacting with a buffer solution in the presence of a Pd/C catalyst (J. Org. Chem., 31, 885 (1966)) or by reacting with a buffer solution in the presence of a platinum catalyst.

When the hydrolyzable group is a halogen group, in particular a chlorine, the hydrolysis is generally carried out at 0 to 60° C., preferably in the presence of a base, such as sodium bicarbonate, which is used for neutralizing the byproduct hydrochloric acid, although the conditions are not limited thereto.

Introduction of a Group Represented by General Formula (1)

The vinyl polymer having a group of the general formula (1) at at least one terminus according to the present invention can be produced by reacting the vinyl polymer (II) having a silanol group at at least one terminus as prepared above with a silicone compound represented by the general formula (6);

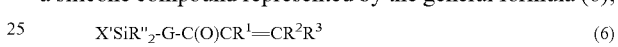

$$X'SiR''_2\text{-}G\text{-}C(O)CR^1{=}CR^2R^3 \qquad (6)$$

wherein $R^1$, $R^2$ and $R^3$ are as defined hereinbefore; R'' represents a hydrocarbon group of 1 to 14 carbon atoms or a halogenated hydrocarbon group of 1 to 10 carbon atoms; the plurality of R'' may be the same or different; X' represents a hydrolyzable group; G represents an oxyalkylene group of 1 to 4 carbon atoms.

Referring to the general formula (6), G is preferably a group represented by a formula selected from the group consisting of —$CH_2O$—, —$CH_2CH_2O$—, —$CH_2CH_2CH_2O$— and —$CH_2CH(CH_3)CH_2O$—, although these are not exclusive choices.

In this reaction, X' is a group which may condense with the silanol group of polymer (II) to form a siloxane (namely, Si—O—Si) bond and may give SiOH on hydrolysis. And the compound of the general formula (6) or a hydrolyzate thereof condenses with the SiOH group of polymer (II) to form a siloxane bond. The X' group is selected from among the hydrolyzable groups mentioned hereinbefore in connection with the silicon compound having a hydrolyzable group and a hydrosilyl group for use in the production of polymer (II). X' is preferably a chlorine.

This reaction is typically conducted in an organic solvent (e.g. tetrahydrofuran (THF), diethyl ether, chloroform, toluene, hexane, or a mixture thereof). The reaction temperature suitable for this condensation is dependent on the individual species of the X group, for while certain X groups are ready to react at room temperature, others require high temperatures or even a condensation catalyst for going through the reaction. The combination required in each case belongs to the scope of one skilled in the art and the optimum combination can be easily determined by routine experimentation. X' is preferably a chlorine atom, and the following reaction is carried out generally in the presence of an acid acceptor, such as pyridine, triethylamine and dibutylamine, in order to neutralize the byproduct hydrochloric acid. In the above mode of practice, the preferred reaction temperature is 0 to 100° C.

<<Description of the Curable Composition>>

The curable composition which constitutes the second aspect of the present invention is now described.

The polymer (I) having at least one group of the general formula (1) at terminus according to the invention may form a curable composition. Such a curable composition is cured by heat, visible light or ultraviolet radiation. When the group represented by general formula (1) is a cinnamate group, the polymer may undergo dimerization on exposure to light or the like even in the absence of a catalyst and, therefore, does not essentially call for addition of a catalyst, although, it is preferable to use a photopolymerization initiator or a thermal polymerization initiator as the catalyst. Moreover, where necessary, a cocatalyst such as a sensitizer may also be used. The same applies to cases where the group represented by general formula (1) is a conjugated diene group which is capable of crosslinking on heating even in the absence of a catalyst.

<Photopolymerization Initiator>

The photopolymerization initiator that can be used in the curable composition of the invention is not particularly restricted but is preferably a photoradical initiator or a photoanionic initiator. For example, there can be mentioned acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis (4-dimethylaminophenyl) ketone, benzyl methoxy ketal and 2-chlorothioxanthone. These initiators can be used alone or in combination with other compounds. As specific examples, combinations with an amine such as diethanolmethylamine, dimethylethanolamine, triethanolamine or the like, said combinations further including an iodonium salt such as diphenyliodonium chloride, and combinations with a colorant, e.g. methylene blue, and an amine can be mentioned.

As the near-infrared photopolymerization initiator, cationic dyes absorbing in the near infrared (IR) region of the spectrum can be used. As such near IR-absorbing cationic dyes, it is preferable to use the near-IR-absorbing cationic dye-borate anion complexes which are excited by photoenergy within the range of 650 to 1500 nm as disclosed in Japanese Kokai Publication Hei-3-111402 and Japanese Kokai Publication Hei-5-194619, among others, and it is still more advantageous to use a boron-type sensitizer in combination.

The photopolymerization initiator is used in a sufficient amount to attain the desired curing velocity. When the amount is too small, the cure time is prolonged beyond the acceptable limit. When the amount of the photopolymerization initiator is too large, the physical and mechanical properties of the cured composition are adversely affected. The optimum amount is not restricted but the proportion of the photopolymerization initiator may range from 0.25 to 0.5 part per 100 parts of the polymer (I) of the invention.

In the curable composition of the invention, the photopolymerization initiator responds to light, for example UV light, to form a radical which induces the crosslinking reaction of polymer (I). Thus, radicals generated by the UV light, for instance, and the photopolymerization initiator react with each other to form a crosslink.

<Thermal Polymerization Initiator>

The thermal polymerization initiator is not particularly restricted but includes azo compounds, peroxides, persulfates and redox initiators.

Suitable azo initiators include but are not limited to 2,2'-azobis(4-methoxy-2,4-dimethylvaleronitrile) (VAZO 33), 2,2'-azobis(2-amidinopropane) dihydrochloride (VAZO 50), 2,2'-azobis(2,4-dimethylvaleronitrile) (VAZO 52), 2,2'-azobis (isobutyronitrile) (VAZO 64), 2,2'-azobis-2-methylbutyronitrile (VAZO 67), 1,1-azobis(1-cyclohexanecarbonitrile) (VAZO 88) (all available from DuPont Chemical), 2,2'-azobis(2-cyclopropylpropionitrile), and 2,2'-azobis(methyl isobutyrate) (V-601) (available from Wako Pure Chemical Ind.), among others.

Suitable peroxide initiators include but are not limited to benzoyl peroxide, acetyl peroxide, lauroyl peroxide, decanoyl peroxide, dicetylperoxy dicarbonate, di(4-t-butylcyclohexyl) peroxydicarbonate (Perkadox 16S) (available from Akzo Nobel), di (2-ethylhexyl) diperoxycarbonate, t-butyl peroxypivalate (Lupersol 11) (available from Elf Atochem), t-butyl peroxy-2-ethyl hexanoate (Trigonox 21-C50) (available from Akzo Nobel), and dicumyl peroxide.

Suitable persulfate initiators include but are not limited to potassium persulfate, sodium persulfate, and ammonium persulfate.

Suitable redox (oxidation-reduction) initiators include but are not limited to combinations of said persulfate initiators with a reducing agent such as sodium hydrogen metasulfite and sodium hydrogen sulfite; organic peroxide-tertiary amine systems, e.g. benzoyl peroxide-dimethylaniline; and organic hydroperoxide-transition metal systems, e.g. cumene hydroperoxide-cobalt naphthenate.

Other initiators include but are not limited to pinacols such as tetraphenyl-1,1,2,2-ethanediol.

Preferred thermal radical initiators can be selected from among azo initiators and peroxide initiators. Still more preferred are 2,2'-azobis(methyl isobutyrate), t-butyl peroxypivalate, di(4-t-butylcyclohexyl) peroxydicarbonate, and a mixture thereof.

The thermal polymerization initiator in the present invention should be added in a catalytically effective amount which is not particularly restricted but is typically about 0.01 to 5 weight parts, preferably about 0.025 to 2 weight parts based on 100 weight parts of the polymer having a group of the general formula (1) at at least one terminus and the other monomer/oligomer combined.

<Monomer/Oligomer>

The curable composition of the present invention is essentially comprised of the components mentioned above and for avoiding the odor problem associated with the residual monomer, preferably does not contain other polymerizable monomers. However, depending on the intended application, polymerizable monomers and/or oligomers and various additives may also be formulated. As such polymerizable monomers and/or oligomers, it is preferable to use monomers and/or oligomers having radical-polymerizable groups or monomers and/or oligomers having anion-polymerizable groups. As the radical-polymerizable groups, there can be mentioned groups of the general formula (I), acrylic functional groups such as (meth)acryloyl, styryl, acrylonitrile, vinyl ester, N-vinylpyrrolidone, acrylamide, conjugated diene, vinyl ketone, and vinyl chloride groups, among others. Among these, those having a (meth)acryloyl group similar to the functional group in the polymer of the invention are preferred. The anion-polymerizable groups include groups of the general formula (I) (meth)acryloyl, styryl, acrylonitrile, N-vinylpyrrolidone, acrylamide, conjugated diene, and vinyl ketone groups, among others. Among these, those having a group of the general formula (I) or an acrylic functional group are preferred.

As examples of such monomers, there can be mentioned (meth) acrylate monomers, cyclic acrylates, N-vinylpyrrolidone, styrenic monomers, acrylonitrile, N-vinylpyrrolidone, acrylamide monomers, conjugated diene monomers and vinyl ketone monomers, among others. The (meth)acrylate monomers include n-butyl (meth)acrylate, 2-ethylhexyl (meth)acrylate, isooctyl (meth)acrylate, isononyl (meth)acrylate, and compounds of the following formulas.

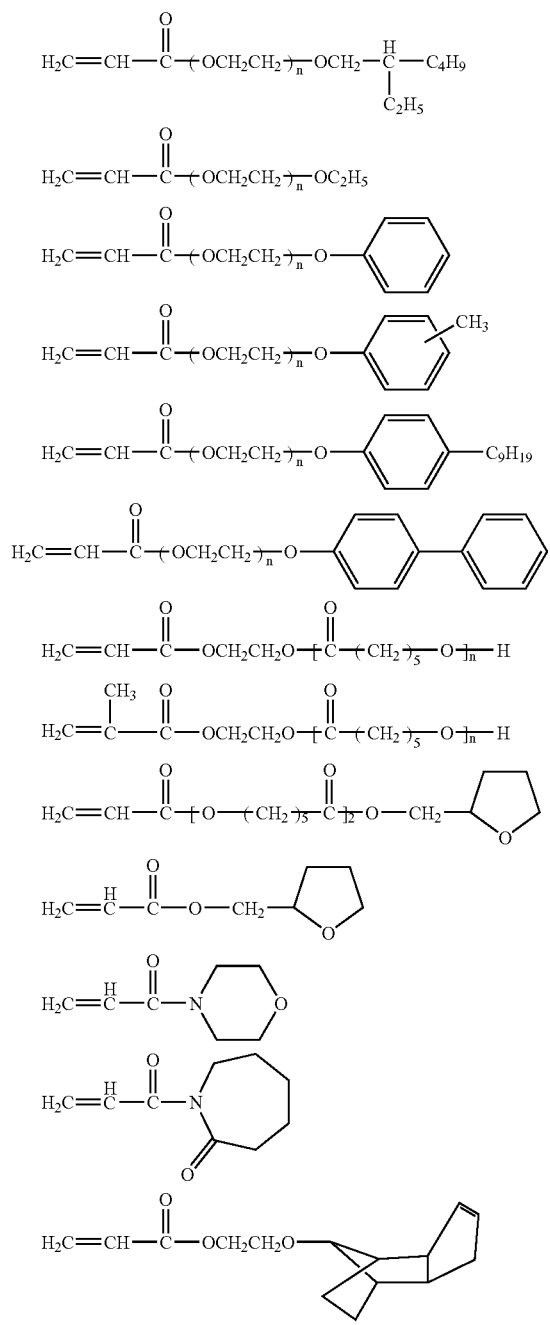

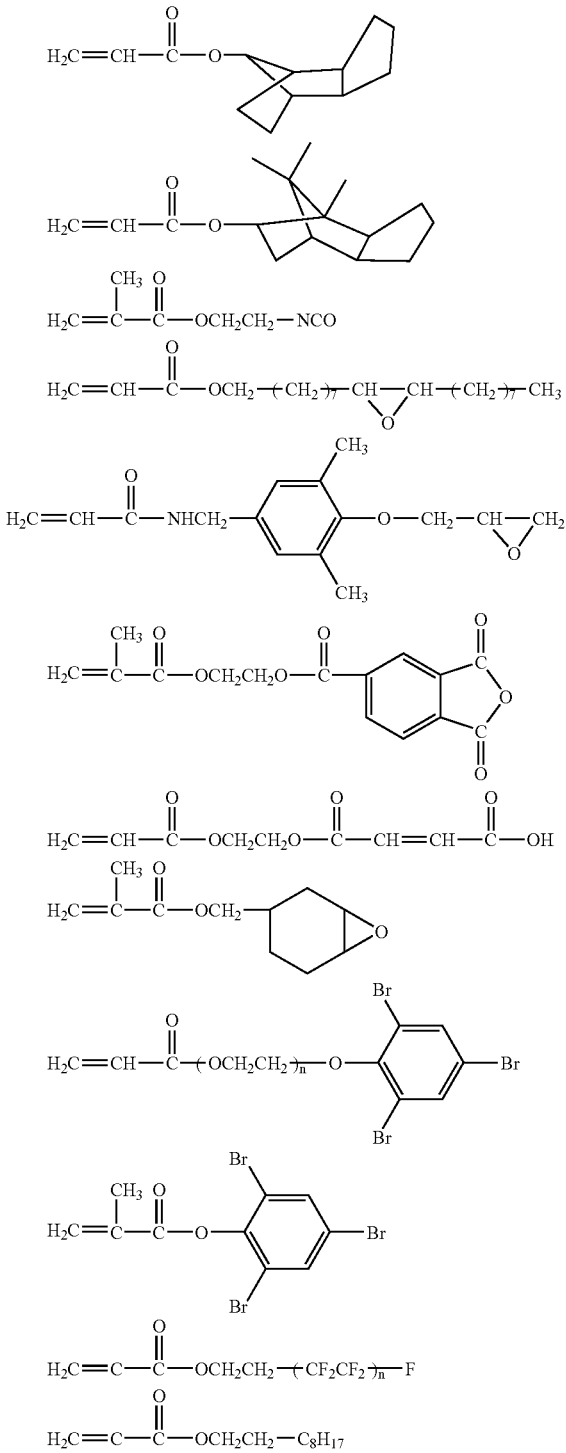

The styrenic monomer includes styrene, α-methylstyrene, etc.; the acrylamide monomer includes acrylamide, N,N-dimethylacrylamide, etc.; the conjugated diene monomer includes butadiene, isoprene, etc.; and the vinyl ketone monomer includes methyl vinyl ketone, among others.

The polyfunctional monomer includes neopentyl glycol polypropoxy diacrylate, trimethylolpropane polyethoxy triacrylate, bisphenol F polyethoxy diacrylate, bisphenol A polyethoxy diacrylate, dipentaerythritol polyhexanolide hexaacrylate, tris (hydroxyethyl) isocyanurate polyhexanolide triacrylate, tricyclodecanedimethylol diacrylate, 2-(2-acryloyloxy-1,1-dimethyl)-5-ethyl-5-acryloyloxymethyl-1,3-dioxane, tetrabromobisphenol A diethoxy diacrylate, 4,4-dimercaptodiphenyl sulfide dimethacrylate, polytetraethylene glycol diacrylate, 1,9-nonanediol diacrylate and ditrimethylolpropane tetraacrylate, among others.

The oligomer includes epoxy acrylate resins such as bisphenol A epoxy acrylate resin, phenol novolac epoxy acrylate resin, cresol novolac epoxy acrylate resin, etc., COOH-modified epoxy acrylate resins, urethane acrylate resins obtainable by reacting a hydroxyl-containing (meth) acrylate [e.g. hydroxyethyl (meth) acrylate, hydroxypropyl (meth) acrylate, hydroxybutyl (meth)acrylate, or pentaerythritol triacrylate] with the urethane resin obtained from a polyol (e.g. polytetramethylene glycol, ethylene glycol-adipic acid polyester diol, å-caprolactone-modified polyester diols, polypropylene glycol, polyethylene glycol, polycarbonate diols, hydroxy-terminated hydrogenated polyisoprene, hydroxy-terminated polybutadiene, hydroxy-terminated polyisobutylene, etc.) and an organic isocyanate (e.g. tolylene diisocyanate, isophorone diisocyanate, diphenylmethane diisocyanate, hexamethylene diisocyanate, xylylene diisocyanate, etc.), and resins synthesized by introducing (meth) acryloyl groups into said polyols through ester linkages, and polyester acrylate resins.

Further, as the monomer and/or oligomer to be added, the 3-arylacrylic acid compounds disclosed in Japanese Kohyo Publication Hei-10-508642 are also preferred.

These monomers and oligomers are selected with reference to the polymerization initiator and curing conditions to be used.

The number average molecular weight of the acrylic functional group-containing monomer and/or oligomer is preferably not larger than 2000 and, from a compatibility point of view, is more preferably not larger than 1000.

<Additives>

To modify the properties of the curable composition, additional components can be formulated. The mechanical strength of the cured composition can be further increased by adding a reinforcing filler. The preferred reinforcing filler includes silica and carbon black, among others. Furthermore, extender fillers such as clay and calcium carbonate; pigments; dyes; thickeners; etc. may also be formulated.

<Curing>

The method of curing the curable composition of the invention is not particularly restricted. In the case of photocuring, depending on the properties of the photopolymerization initiator, the composition is irradiated with light or an electron beam using a high-pressure mercury vapor lamp, low-pressure mercury vapor lamp, electron beam generator, halogen vapor lamp, light-emitting diode, semiconductor laser or the like.

The UV radiation dose necessary for the crosslinking of the functionalized curable composition of the present invention depends on many variables and, therefore, the optimum dose should be determined by experimentation. The wavelength of UV light, the density and type of optically active functional groups on the organic polymer, the amount and kind of photoinitiator, reactor design and other factors are invariably relevant to the UV radiation dose necessary for the curing of the functionalized polymer.

The method for thermal curing of the curable composition of the present invention is not particularly restricted. The temperature to be used depends on the kinds of thermal initiator, polymer (I) and additive components, etc. but is preferably in the range of 50° C. to 150° C. in ordinary cases, more preferably 70° C. to 130° C. The cure time, which is correlated with the polymerization initiator, monomer, solvent, reaction temperature, etc., is generally 1 minute to 10 hours.

<Use>

Being curable in the above manner, the curable composition of the present invention is suitable for use as a surface coating, an adhesive or a sealant.

Such a coating imparts water-proof to the substrate. The substrate for this application typically includes metals, e.g. aluminum, steel, iron and brass, masonry materials, e.g. concrete, marble and other stones, cellulosic materials, e.g. paper, cotton, fiber-boards, paperboard, wood, woven and nonwoven fabrics, and plastics, e.g. polycarbonates, among others.

As regards the properties of cured products obtainable from the curable composition of the invention, a broad range of products ranging from rubbery ones to resinous ones can be freely designed according to the molecular weight and main chain structure of the polymer. Therefore, as specific uses for the curable composition of the invention, there can be mentioned sealants, adhesives, self-adhesives, elastic adhesives, coatings, powder coatings, foams, electric/electronic potting materials, film, gaskets, resists, various molding compounds and man-made marble, among others.

BEST MODE FOR CARRYING OUT THE INVENTION

The following examples and comparative examples illustrate the present invention in further detail, it being, however, to be understood that these examples are by no means definitive of the scope of the invention.

As referred to in the following examples, the "number average molecular weight" and "molecular weight distribution (ratio of weight average molecular weight to number average molecular weight)" are the values determined by gel permeation chromatography (GPC) based on polystyrene standards. Thus, columns packed with crosslinked polystyrene gels were used as the GPC columns and chloroform was used as the GPC solvent.

PRODUCTION EXAMPLE 1

Examples of Synthesis of a Br Group-terminated Poly(butylacrylate)

A 10-L separable flask equipped with a reflux-condenser and a stirrer was charged with CuBr (28.0 g, 0.20 mol), followed by nitrogen gas purging. Then, acetonitrile (559 mL) was added and the mixture was stirred on an oil bath at 70° C. for 40 minutes. Thereafter, butyl acrylate (1.00 kg), diethyl 2,5-dibromoadipate (117 g, 0.505 mol) and pentamethyldiethylenetriamine [hereinafter sometimes referred to briefly as triamine] (1.7 mL, 1.41 g, 8.1 mmol) were added and the reaction was started. Under heating at 70° C. with constant stirring, butyl acrylate (4.00 kg) was continuously added dropwise. In the course of dripping butyl acrylate, triamine (8.5 mL, 7.06 g, 0.041 mol) was further added.

This reaction mixture was diluted with toluene and passed through an activated alumina column, and the volatile matter was distilled off under reduced pressure, whereby a Br group-terminated polymer (polymer [1]) was obtained. This polymer [1] had a number average molecular weight of 19500 and a molecular weight distribution value of 1.17.

EXAMPLE 1

Example of Synthesis of Cinnamate-terminated Poly(butylacrylate)

A 50-mL reactor was charged with the polymer [1] (10 g) obtained in Production Example 1, potassium cinnamate (0.38 g, 2.1 mmol) and dimethylacetamide (10 mL), and the charge was stirred under nitrogen at 70° C. for 3 hours. After the volatile matter was removed by heating under reduced pressure, the residue was diluted with toluene and passed through an activated alumina column. The toluene was then distilled off under reduced pressure to give a cinnamate ($-OC(O)-CH=CH-C_6H_5$)— terminated poly(butyl acrylate) (polymer [2]). The polymer [2] had a number average molecular weight of 20500 and a molecular weight distribution value of 1.19. The average number of cinnamate groups introduced per molecule of the polymer was 1.8 as determined by $^1H$ NMR analysis.

EXAMPLE 2

Example of Synthesis of Conjugated Diene-terminated Poly(butyl acrylate)

A 100-mL reactor was charged with the polymer [1] (10 g) obtained in Production Example 1, potassium sorbate (0.31 g, 2.1 mmol) and dimethylacetamide (10 mL). The charge was stirred under nitrogen at room temperature for 24 hours and then stirred with heating at 70° C. for an additional 2 hours. This reaction mixture was diluted with toluene, passed through an activated alumina column, and washed with water. The organic layer was concentrated under reduced pressure to give a poly(butyl acrylate) having the sorbic acid-derived conjugated diene structure ($-OC(O)CH=CH-CH=CH-CH_3$) at a terminus (polymer [3]). The polymer [3] had a number average molecular weight of 20600 and a molecular weight distribution value of 1.20. The average number of conjugated diene groups introduced per molecule of the polymer was 2.1 as determined by $^1H$ NMR analysis.

EXAMPLE 3

Example 1 of Production of a Cured Product

The polymer [2] (100 parts) obtained in Example 1 was mixed well with the organic peroxide Perhexa 3M (1,1-di-(t-butylperoxy)-3,3,5-trimethylcyclohexane; product of NOF Corporation) (2 parts) and the mixture was poured into a reaction vessel and defoamed under reduced pressure. Under nitrogen, the mixture was heated at 150° C. for 5 minutes, whereupon a cured product having rubber-like elasticity was obtained.

The uncured matter in the cured product was extracted with toluene and the gel fraction was calculated from the difference in weight of the cured product before and after extraction. The gel fraction was 75%.

EXAMPLE 4

Example 2 of Production of a Cured Product

The polymer [3] (100 parts) obtained in Example 2 was mixed well with the organic peroxide Perhexa 3M (1,1-di-(t-butylperoxy)-3,3,5-trimethylcyclohexane; product of NOF Corporation) (2 parts) and the mixture was poured into a reaction vessel and defoamed under reduced pressure. Under nitrogen, the mixture was heated at 150° C. for 15 minutes, whereupon a cured product having rubber-like elasticity was obtained.

The uncured matter in the cured product was extracted with toluene and the gel fraction was calculated from the difference in weight of the cured product before and after extraction. The gel fraction thus found was 95%.

INDUSTRIAL APPLICABILITY

The vinyl polymer having a group represented by the general formula (1) at a terminus contains the reactive function group at a high rate and, as such, can undergo thermal/photocuring so that it can be used with advantage as a coating material, among other applications. Moreover, since the main chain of the polymer is a vinyl polymer, the cured product is highly resistant to weathering. Furthermore, because the functional group has been introduced into the polymer terminus, the cured product has rubber-like elasticity, among other characteristics.

The invention claimed is:

1. A vinyl polymer having at least one group of the general formula (1) at a molecular chain terminus;

$$-Z-R-CR^1=CR^2R^3 \qquad (1)$$

wherein Z represents an oxygen atom, a sulfur atom, a group of the formula NR', R' represents a univalent hydrocarbon group containing 1 to 20 carbon atoms, or a bivalent organic group containing 1 to 20 carbon atoms; R represents a carbonyl group, a direct bond or a bivalent organic group containing 1 to 20 carbon atoms; $R^1$ and $R^2$ are the same or different and each represents a hydrogen atom or a univalent organic group containing 1 to 20 carbon atoms; $R^3$ represents a univalent organic group containing 1 to 20 carbon atoms;

which is obtained by reacting a vinyl polymer (II) having a silanol group at at least one molecular chain terminus with a silicon compound of the general formula (6);

$$X'SiR''_2\text{-}G\text{-}C(O)CR^1=CR^2R^3 \qquad (6)$$

wherein $R^1$ and $R^2$ are the same or different and each represents a hydrogen atom or a univalent organic group containing 1 to 20 carbon atoms; $R^3$ represents a univalent organic group containing 1 to 20 carbon atoms; R" represents a hydrocarbon group containing 1 to 14 carbon atoms or a halogenated hydrocarbon group containing 1 to 10 carbon atoms; the plurality of R" may be the same or different; X' represents a hydrolyzable group; G represents an oxyalkylene group containing 1 to 4 carbon atoms; and wherein G in the general formula (6) is $-CH_2O-$, $-CH_2CH_2O-$, $-CH_2CH_2CH_2O-$ or $-CH_2CH(CH_3)CH_2O-$.

2. The polymer according to claim 1 wherein the silanol group of the vinyl polymer (II) is represented by the general formula (7); $-[Si(R^5)_{2-b}(OH)_bO]_m-Si(R^6)_{3-a}(OH)_a$ wherein $R^5$ and $R^6$ are the same or different and each represents an alkyl group containing 1 to 20 carbon atoms, an aryl group containing 6 to 20 carbon atoms, an aralkyl group containing 7 to 20 carbon atoms, or a triorganosiloxy group of the formula $(R')_3Si-$, where R' represents a univalent hydrocarbon group containing 1 to 20 carbon atoms and the three R' groups may be the same or different; when $R^5$ or $R^6$ occurs in the number of 2 or more, the plurality of groups may be the same or different; a represents 0, 1, 2 or 3; b represents 0, 1 or 2; m is an integer of 0 to 19; with the condition that the relation of a +mb≧1 is satisfied.

3. The polymer according to claim 2 wherein m in the general formula (7) is equal to 0.

4. The polymer according to claim 1 wherein the vinyl polymer (II) is obtained by subjecting a vinyl polymer having at least one alkenyl group at a terminus to hydrosilylation reaction with a silicon compound having both a hydrolyzable group linked to a silicon atom and a hydrosilyl group and then hydrolyzing the hydrolyzable group linked to the silicon atom for conversion to a silanol group.

5. The polymer according to claim 4 wherein the silicon compound having both a hydrolyzable group linked to a silicon atom and a hydrosilyl group is chlorodimethylsilane.

6. The polymer according to claim 2 wherein the vinyl polymer (II) is obtained by subjecting a vinyl polymer having at least one alkenyl group at a terminus to hydrosilylation reaction with a silicon compound having both a hydrolyzable group linked to a silicon atom and a hydrosilyl group and then hydrolyzing the hydrolyzable group linked to the silicon atom for conversion to a silanol group.

7. The polymer according to claim 3 wherein the vinyl polymer (II) is obtained by subjecting a vinyl polymer having at least one alkenyl group at a terminus to hydrosilylation reaction with a silicon compound having both a hydrolyzable group linked to a silicon atom and a hydrosilyl group and then hydrolyzing the hydrolyzable group linked to the silicon atom for conversion to a silanol group.

8. The polymer according to claim 2 wherein the silicon compound having both a hydrolyzable group linked to a silicon atom and a hydrosilyl group is chlorodimethylsilane.

9. The polymer according to claim 3 wherein the silicon compound having both a hydrolyzable group linked to a silicon atom and a hydrosilyl group is chlorodimethylsilane.

10. A curable composition comprising the polymer according to claim 2.

11. A curable composition comprising the polymer according to claim 3.

12. A curable composition comprising the polymer according to claim 4.

13. A curable composition comprising the polymer according to claim 5.

14. A curable composition comprising the polymer according to claim 6.

* * * * *